(12) United States Patent  
Kikuchi

(10) Patent No.: US 12,407,922 B2
(45) Date of Patent: Sep. 2, 2025

(54) IMAGING ASSISTANCE APPARATUS, IMAGING SYSTEM, IMAGING ASSISTANCE METHOD, AND IMAGING ASSISTANCE PROGRAM

(71) Applicant: FUJIFILM Corporation, Tokyo (JP)

(72) Inventor: Hiroaki Kikuchi, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 221 days.

(21) Appl. No.: 17/898,293

(22) Filed: Aug. 29, 2022

(65) Prior Publication Data

US 2022/0417415 A1 Dec. 29, 2022

Related U.S. Application Data

(63) Continuation of application No. PCT/JP2021/001039, filed on Jan. 14, 2021.

(30) Foreign Application Priority Data

Mar. 31, 2020 (JP) .................. 2020-064082

(51) Int. Cl.
*H04N 23/66* (2023.01)
*G02B 27/20* (2006.01)
(Continued)

(52) U.S. Cl.
CPC ............. *H04N 23/66* (2023.01); *G02B 27/20* (2013.01); *H04N 23/51* (2023.01); *H04N 23/56* (2023.01);
(Continued)

(58) Field of Classification Search
CPC .......... G02B 27/20; G02B 7/32; G03B 15/00; G03B 3/00; H04N 23/51; H04N 23/56; H04N 23/66; H04N 23/675; H04N 23/695
See application file for complete search history.

(56) References Cited

U.S. PATENT DOCUMENTS

2011/0164635 A1 7/2011 Takada et al.
2016/0103209 A1* 4/2016 Masuda ............... G03B 17/56
348/135

(Continued)

FOREIGN PATENT DOCUMENTS

JP H01-291112 A 11/1989
JP H06-59814 U 8/1994
(Continued)

OTHER PUBLICATIONS

International Search Report issued in PCT/JP2021/001039; mailed Apr. 6, 2021.
(Continued)

*Primary Examiner* — Amy R Hsu
(74) *Attorney, Agent, or Firm* — Studebaker Brackett PLLC

(57) ABSTRACT

In one aspect, an imaging assistance apparatus includes: a laser light projection device having a laser light source that generates laser light and a laser head provided with an optical element that projects the laser light as patterned light having a determined pattern; a reception device that receives a first operation; a projection instruction device that instructs the laser light projection device during laser light projection to end the projection of the patterned light, on the basis of the first operation; and an imaging instruction device that instructs an imaging device to image a subject on which focusing control is performed, on the basis of the first operation.

22 Claims, 20 Drawing Sheets

(51) Int. Cl.
    *H04N 23/51*     (2023.01)
    *H04N 23/56*     (2023.01)
    *H04N 23/67*     (2023.01)
    *H04N 23/695*     (2023.01)

(52) U.S. Cl.
    CPC ......... *H04N 23/675* (2023.01); *H04N 23/695* (2023.01)

(56) References Cited

U.S. PATENT DOCUMENTS

| | | | | |
|---|---|---|---|---|
| 2019/0346743 | A1* | 11/2019 | Torobu | ................. H04N 23/662 |
| 2019/0354747 | A1* | 11/2019 | Chi | ........................ G06V 10/25 |

FOREIGN PATENT DOCUMENTS

| | | |
|---|---|---|
| JP | H08-313799 A | 11/1996 |
| JP | 2002-056348 A | 2/2002 |
| JP | 2002-236251 A | 8/2002 |
| JP | 2009-086559 A | 4/2009 |
| JP | 2010-072559 A | 4/2010 |
| JP | 2011-142187 A | 7/2011 |
| JP | 2011-151288 A | 8/2011 |
| JP | 2019-211572 A | 12/2019 |

OTHER PUBLICATIONS

International Preliminary Report on Patentability (Chapter I) and Written Opinion of the International Searching Authority issued in PCT/JP2021/001039; issued Sep. 29, 2022.

"Notice of Reasons for Refusal" Office Action issued in JP 2022-511551; mailed by the Japanese Patent Office on Oct. 1, 2024.

An Office Action; "Notice of Reasons for Refusal," mailed by the Japanese Patent Office on Feb. 5, 2024, which corresponds to Japanese Patent Application No. 2022-511551 and is related to U.S. Appl. No. 17/898,293; with English language translation.

\* cited by examiner

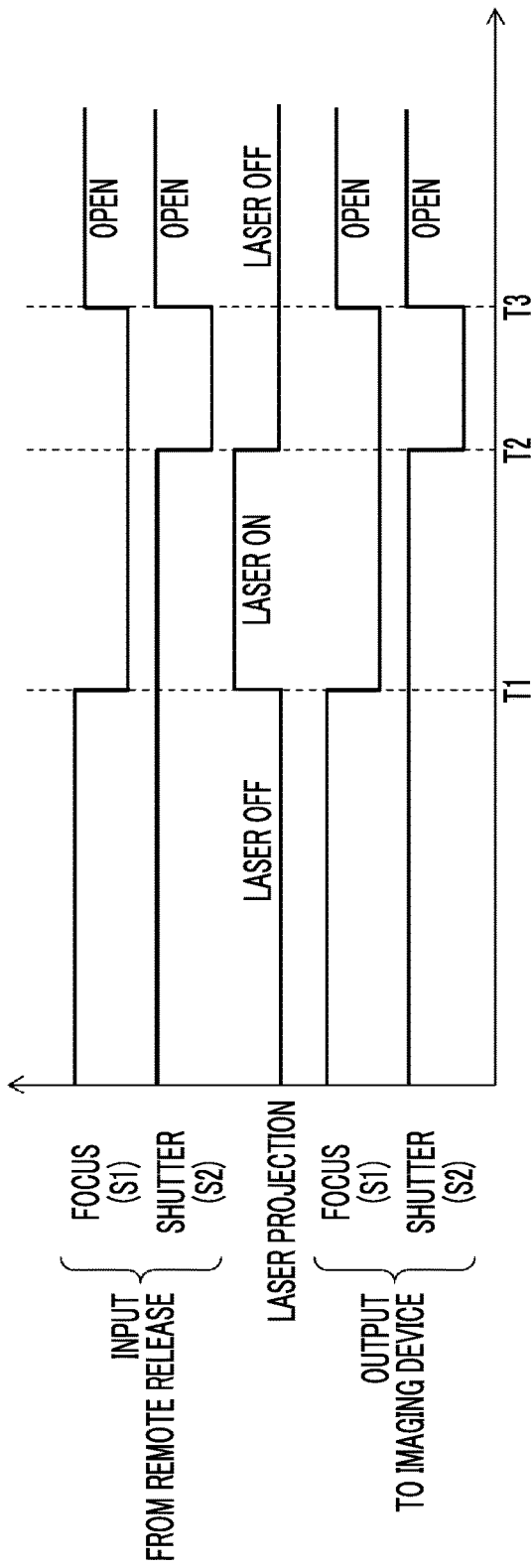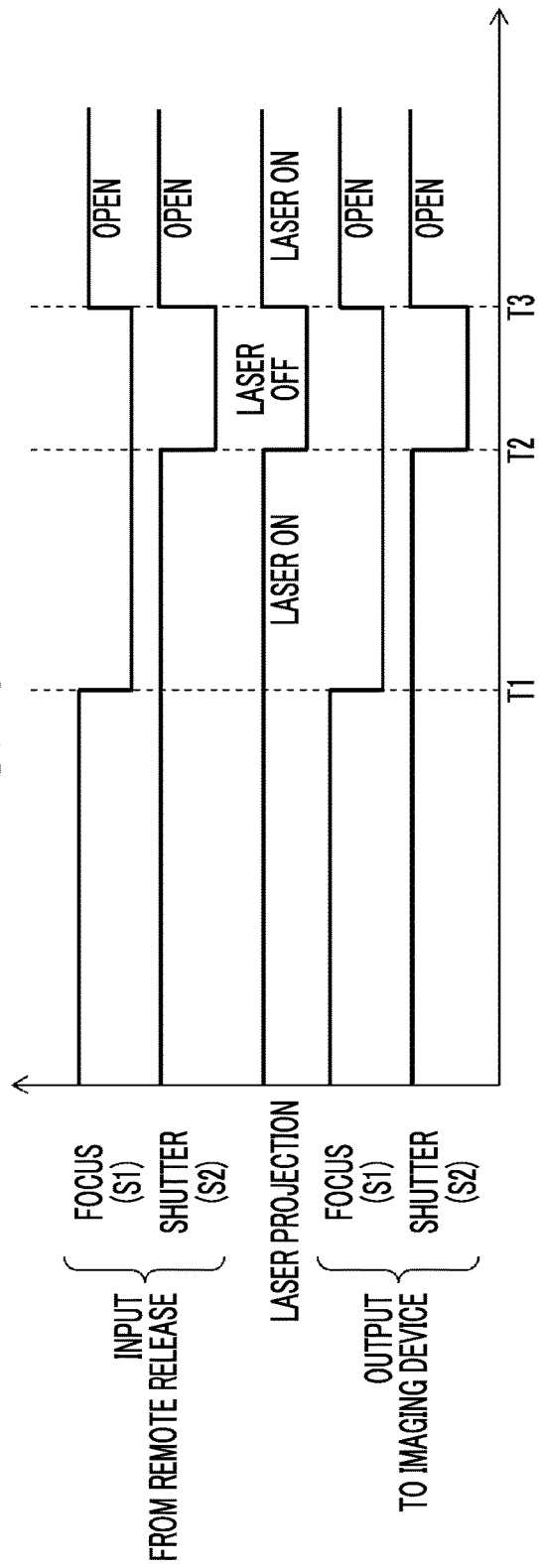

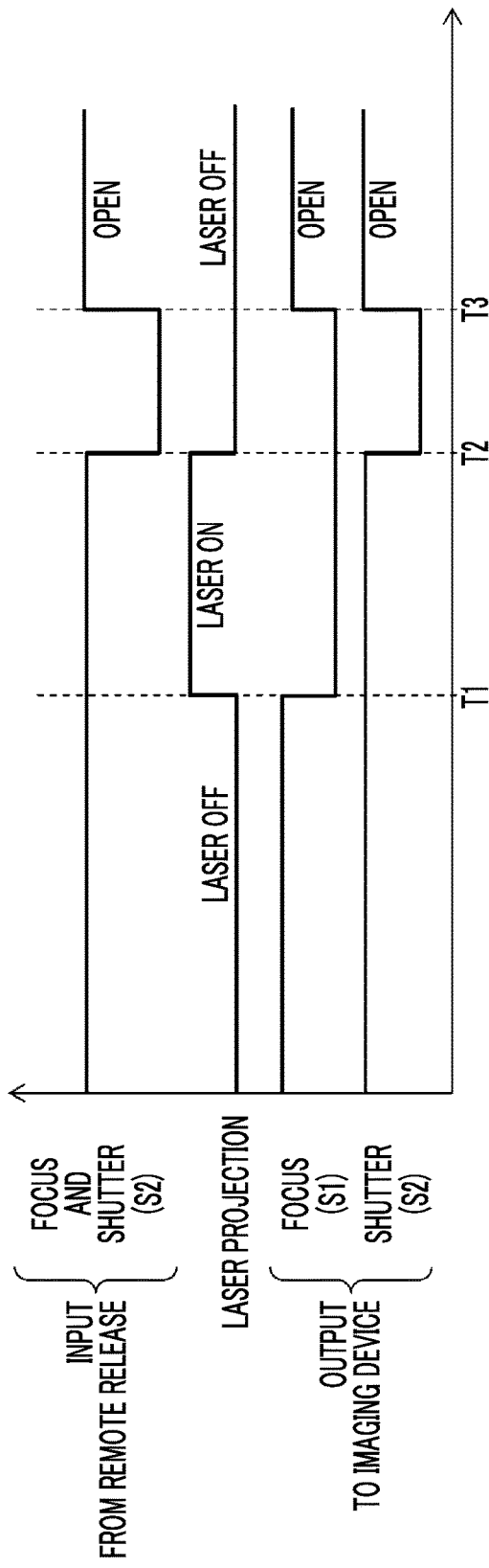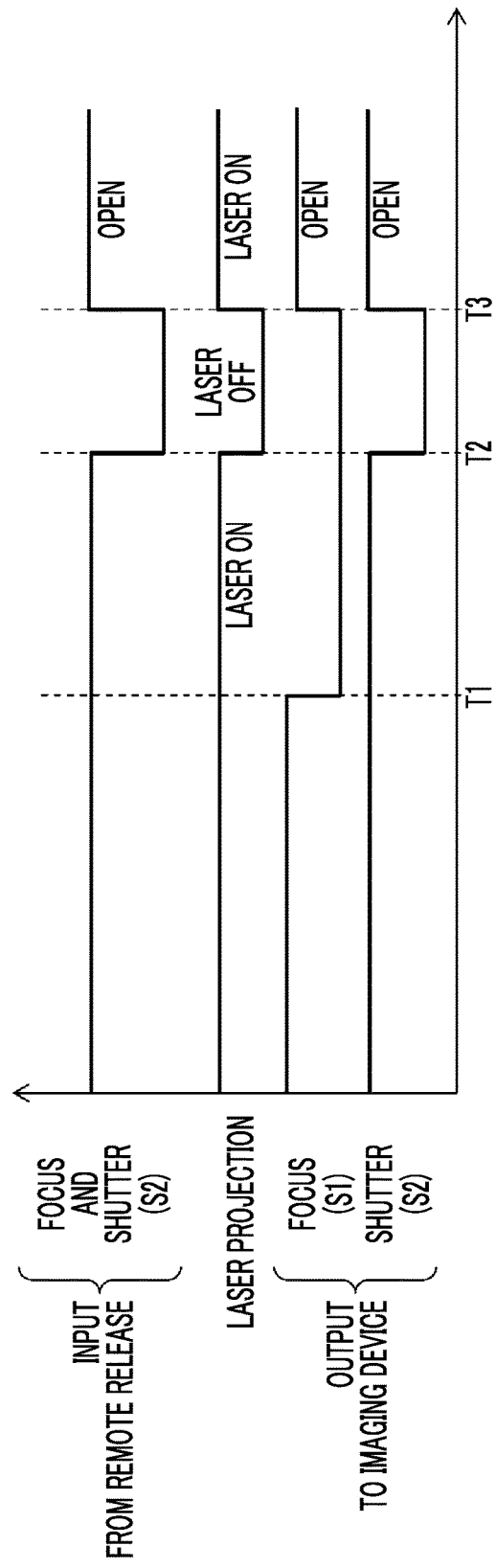

IMAGING ASSISTANCE APPARATUS, IMAGING SYSTEM, IMAGING ASSISTANCE METHOD, AND IMAGING ASSISTANCE PROGRAM

CROSS-REFERENCE TO RELATED APPLICATIONS

This application is a Continuation of PCT International Application No. PCT/JP2021/001039 filed on Jan. 14, 2021, which claims priority under 35 U.S.C § 119(a) to Japanese Patent Application No. 2020-064082 filed on Mar. 31, 2020. Each of the above application(s) is hereby expressly incorporated by reference, in its entirety, into the present application.

BACKGROUND OF THE INVENTION

1. Field of the Invention

The present invention relates to a technique of imaging a subject by performing focusing control of an imaging device by using auxiliary light.

2. Description of the Related Art

For example, JP2002-236251A discloses that laser light is used as AF auxiliary light. Further, JP2009-086559A discloses that a focus position is set by using a laser pointer.

SUMMARY OF THE INVENTION

However, the technique disclosed in JP2002-236251A described above requires a hologram plate. Further, in the technique disclosed in JP2009-086559A, the laser pointer irradiates a single light spot.

The present invention has been made in view of such circumstances, and provides an imaging assistance apparatus, an imaging system, an imaging assistance method, and an imaging assistance program capable of satisfactorily performing focusing control by using patterned light.

According to a first aspect of the present invention, there is provided an imaging assistance apparatus comprising: a laser light projection device having a laser light source that generates laser light and a laser head provided with an optical element that projects the laser light as patterned light having a determined pattern; a reception device that receives a first operation; a projection instruction device that instructs the laser light projection device during laser light projection to end the projection of the patterned light, on the basis of the first operation; and an imaging instruction device that instructs an imaging device to image a subject on which focusing control is performed, on the basis of the first operation.

In the imaging assistance apparatus according to a second aspect, in the first aspect, the reception device may receive a preparation operation before the first operation, the projection instruction device may instruct the laser light projection device to start the projection of the patterned light, on the basis of the preparation operation, and a focusing instruction device that instructs the imaging device to start the focusing control on the subject on which the patterned light is projected, on the basis of the preparation operation, may be further provided.

In the imaging assistance apparatus according to a third aspect, in the first aspect, the projection instruction device may instruct the laser light projection device to start the projection of the patterned light, on the basis of the first operation, and a focusing instruction device that instructs the imaging device to start the focusing control on the subject on which the patterned light is projected, on the basis of the first operation, may be further provided.

In the imaging assistance apparatus according to a fourth aspect, in the third aspect, the projection instruction device may instruct the laser light projection device to end the projection of the patterned light at a fixed interval after the start of the projection of the patterned light, on the basis of the first operation, and the imaging instruction device may instruct the imaging device to image the subject on which the focusing control is performed, after the focusing instruction device instructs the imaging device to start the focusing control, on the basis of the first operation.

In the imaging assistance apparatus according to a fifth aspect, in any one of the first to fourth aspects, the reception device may receive a second operation, and the projection instruction device may instruct the laser light projection device to change a projection direction of the patterned light, according to the second operation.

In the imaging assistance apparatus according to a sixth aspect, in any one of the first to fifth aspects, the reception device may receive a third operation, and the imaging instruction device may instruct the imaging device to change an imaging direction, according to the third operation.

In the imaging assistance apparatus according to a seventh aspect, in the first aspect, the laser head may be housed in a housing independent of the projection instruction device and the imaging instruction device.

In the imaging assistance apparatus according to an eighth aspect, in any one of the second to fourth aspects, the laser head may be housed in a housing independent of the projection instruction device, the focusing instruction device, and the imaging instruction device.

In the imaging assistance apparatus according to a ninth aspect, in any one of the second to fourth aspects, the laser head and the reception device may be housed in a single housing.

In the imaging assistance apparatus according to a tenth aspect, in the ninth aspect, the projection instruction device and the imaging instruction device may be housed in the single housing.

In the imaging assistance apparatus according to an eleventh aspect, in the ninth aspect, the projection instruction device, the focusing instruction device, and the imaging instruction device may be housed in the single housing.

In the imaging assistance apparatus according to a twelfth aspect, in any one of the first to eleventh aspects, the laser light source and the laser head are housed in a single housing.

In the imaging assistance apparatus according to a thirteenth aspect, in any one of the first to twelfth aspects, the laser head may project the patterned light with one line or a cross-line in which a plurality of lines are crossed, as the pattern.

In the imaging assistance apparatus according to a fourteenth aspect, in any one of the first to thirteenth aspects, the optical element may be any one of a laser line generator, a rod lens, a cylindrical lens, or a diffraction grating.

In the imaging assistance apparatus according to a fifteenth aspect, in any one of the first to fourteenth aspects, an output of the laser light may be 0.39 mW to 1.0 mW.

According to a sixteenth aspect, there is provided an imaging system comprising: the imaging assistance apparatus according to any one of the first to fifteenth aspects; and the imaging device, in which the imaging device performs the focusing control and the imaging in response to an instruction from the imaging assistance apparatus.

In the imaging system according to a seventeenth aspect, in the sixteenth aspect, the imaging device may recognize the pattern in response to an instruction to perform the focusing control, and focus on a part on which the recognized pattern is projected.

In the imaging system according to an eighteenth aspect, in the sixteenth or seventeenth aspect, a memory in which a repetition instruction for causing the imaging assistance apparatus to repeat a preparation operation performed before the first operation and the first operation at a predetermined cycle is recorded may be further provided, the imaging assistance apparatus may repeat an instruction to start the projection of the patterned light based on the preparation operation and to end the projection of the patterned light based on the first operation, an instruction to perform the focusing control, and an instruction to perform the imaging, in accordance with the repetition instruction, and the imaging device may repeat the focusing control and the imaging at the cycle in response to the instruction from the imaging assistance apparatus to image the subject.

In the imaging system according to a nineteenth aspect, in any one of the sixteenth to eighteenth aspects, the imaging device may detect a plane region of the subject on the basis of the projected pattern and perform the focusing control on the plane region.

In the imaging system according to a twentieth aspect, in any one of the sixteenth to nineteenth aspects, the imaging device may perform the focusing control on the basis of a signal output from a focusing control pixel disposed in an imaging element, and the imaging assistance apparatus may project the patterned light having a pattern corresponding to a disposition direction of the focusing control pixel.

In the imaging system according to a twenty-first aspect, in any one of the sixteenth to twentieth aspects, the imaging device may perform the focusing control on the basis of a signal output from a focusing control pixel disposed in an imaging element, and the imaging assistance apparatus may project laser light having a wavelength range that at least partially overlaps with a transmission wavelength range of an optical filter disposed in the focusing control pixel, as the patterned light.

According to a twenty-second aspect of the present invention, there is provided an imaging assistance method performed by a laser light projection device, which has a laser light source that generates laser light and a laser head provided with an optical element that projects the laser light as patterned light having a determined pattern, and a control device, which has a processor, the method comprising: a reception step of receiving a first operation; a projection instruction step of instructing the laser light projection device during laser light projection to end the projection of the patterned light, on the basis of the first operation; and an imaging instruction step of instructing an imaging device to image a subject on which focusing control is performed, on the basis of the first operation. The twenty-second aspect may further include the same configurations as those of the second to twenty-first aspects.

According to a twenty-third aspect of the present invention, there is provided an imaging assistance program causing a laser light projection device, which has a laser light source that generates laser light and a laser head provided with an optical element that projects the laser light as patterned light having a determined pattern, and a control device, which has a processor, to execute an imaging assistance method, the imaging assistance program causing the processor to execute: a reception function of receiving a first operation; a projection instruction output function of outputting an instruction to end the projection of the patterned light to the laser light projection device during laser light projection, on the basis of an input related to the received first operation; and an imaging instruction output function of outputting an instruction to image a subject on which focusing control is performed to an imaging device, on the basis of the input related to the first operation.

As described above, with the imaging assistance apparatus, the imaging system, the imaging assistance method, and the imaging assistance program according to the aspects of the present invention, it is possible to satisfactorily perform focusing control by using patterned light.

BRIEF DESCRIPTION OF THE DRAWINGS

FIGS. 13A and 13B are diagrams showing an example of a sequence of the focusing control and imaging control.

FIGS. 14A and 14B are diagrams showing another example of the sequence of the focusing control and the imaging control.

DESCRIPTION OF THE PREFERRED EMBODIMENTS

[Imaging of Social Structures]

Regular inspections or reports are required for social structures, such as bridges, tunnels, roads, and buildings (sometimes called "social infra-structures"; "infra" is an abbreviation for "infrastructure"). Concrete and asphalt are often used as materials for these structures. For this reason, in a case where these structures are subjects, it is often difficult to focus because these structures have few features. In addition, in order to recognize damage, such as fine cracking, from the captured image, an illuminance of at least 320 lx (lx represents the unit of illuminance "lux") is required, but the imaging location is often in a low illuminance environment (for example, the environmental illuminance under the bridge is very dark, about several tens of lux), and it is often difficult to focus. Therefore, in a case where the social structure is imaged, it is preferable to project auxiliary light in order to perform accurate focusing control.

Further, in the case of the social structure, imaging is often repeated while changing the direction of the imaging device or moving the position of the imaging device, for reasons such as "long and big" and "provided in a high place". Therefore, it is preferable that the imaging device or an auxiliary light projection device has a structure which is easy to mount on a panhead or a moving body (vehicle, robot, drone, or the like) and which is easy to handle.

However, the conventional techniques do not sufficiently consider such circumstances. The imaging assistance apparatus, the imaging system, the imaging assistance method, and the imaging assistance program of the embodiment of the present invention have been made in view of such circumstances, and embodiments to be exemplified are as follows. A description will be given with reference to the accompanying drawings as necessary.

First Embodiment

[Configuration of Imaging System]

Figure 1:
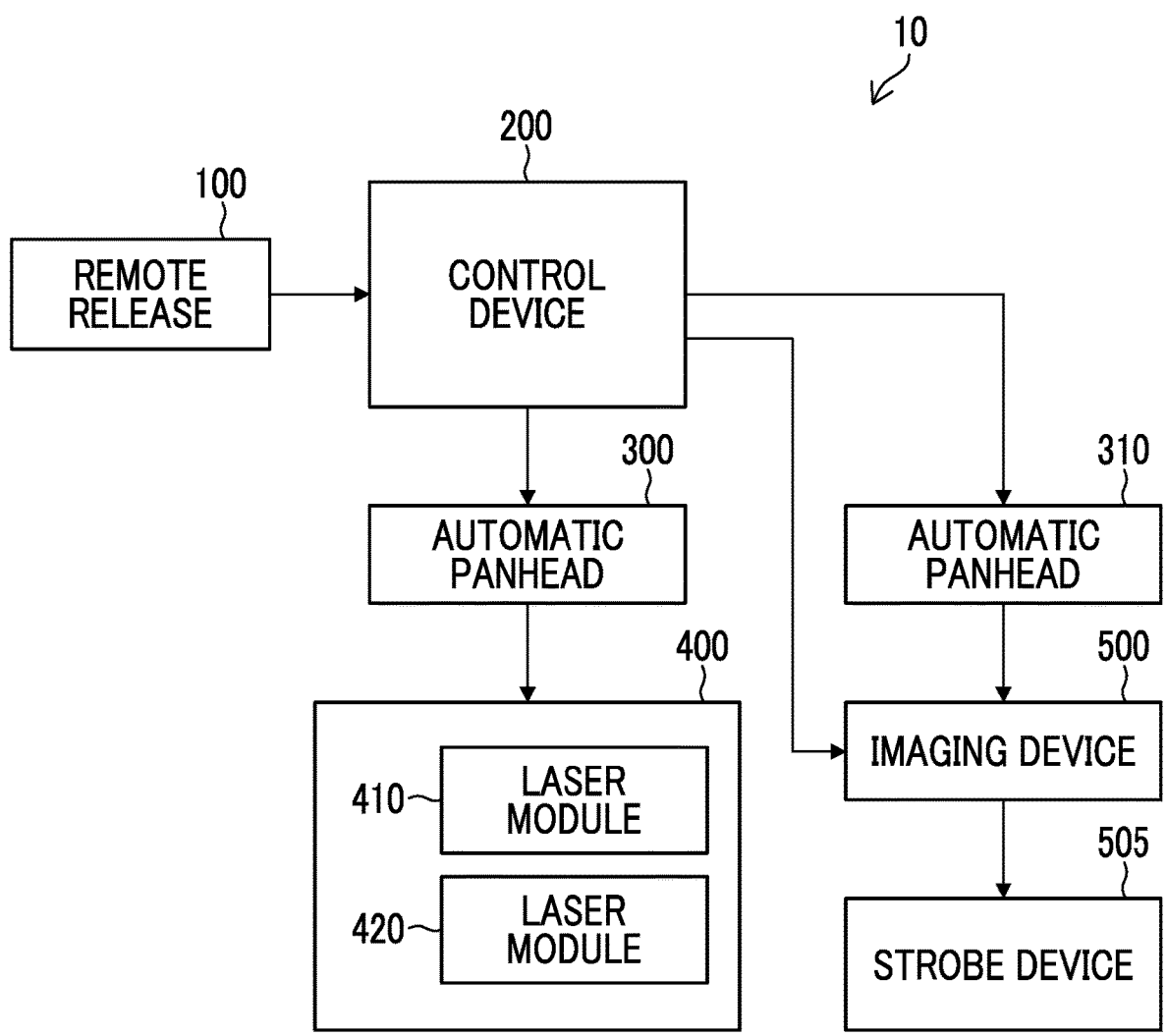
FIG. 1 is a diagram showing a schematic configuration of an imaging system according to a first embodiment.

FIG. 1 is a diagram showing a schematic configuration of an imaging system 10 (imaging system) according to a first embodiment. The imaging system 10 comprises a remote release 100 (imaging assistance apparatus, reception device, and processor), a control device 200 (projection instruction device, focusing instruction device, imaging instruction device, and processor), an automatic panhead 300 (projection instruction device and processor), an automatic panhead 310 (focusing instruction device, imaging instruction device, and processor), a laser light projection device 400 (imaging assistance apparatus, laser light source, optical element, laser head, and laser light projection device), an imaging device 500 (imaging device and processor), and a strobe device 505. The remote release 100, the control device 200, the laser light projection device 400, and the imaging device 500 are housed in independent housings, respectively. The connection between these devices may be wired or wireless.

[Configuration of Remote Release]

The remote release 100 (imaging assistance apparatus, reception device, and processor) comprises an operation member 105 (see FIG. 11) and a processor (not shown), and receives an operation (preparation operation and first operation) of a user via the operation member 105 (reception function). Each function of the remote release 100 (operation reception function, projection instruction output function, focusing instruction function, projection end instruction function, and imaging instruction function) can be realized by using various processors, recording media, and electrical circuits, as in the control device 200, which will be described later. As the operation member 105, for example, a button or a switch that can be moved (pushed) in two stages within a determined stroke range can be used. The operation member 105 may be composed of a plurality of members. The remote release 100 can receive an operation to push the operation member 105 to the middle of the stroke as the preparation operation, and can receive an operation to push the operation member 105 to the end of the stroke as the first operation. The preparation operation is an operation to instruct a laser head 416 (laser head; see FIGS. 3A and 3B) to start the projection of patterned light (auxiliary light) and to instruct the imaging device 500 (imaging device) to perform focusing control on the subject on which the patterned light is projected. The first operation is an operation to instruct (projection end instruction) the laser light projection device 400 during laser light projection to end the projection of the patterned light and to instruct (imaging instruction) the imaging device 500 to image the subject on which the focusing control is performed. The instruction from the remote release 100 to the laser head 416 and the imaging device 500 is given via the control device 200.

In the remote release 100, a lever-shaped (control stick-shaped) member or a handle-type member may be used as the operation member. Further, as the operation target, a device that is operated by, for example, voice or gesture, or a figure, a symbol, an icon, or the like that is electronically moved by a slide operation or the like on a touch panel may be used instead of a mechanical member.

It is preferable that the remote release 100 is a device which receives an operation (second operation) to rotationally move the automatic panhead 300 and/or an operation (third operation) to rotationally move the automatic panhead 310 through the operation member 105 or the like, and which instructs the automatic panheads 300 and 310 to move rotationally via the control device 200.

[Configuration of Control Device]

Figure 2:
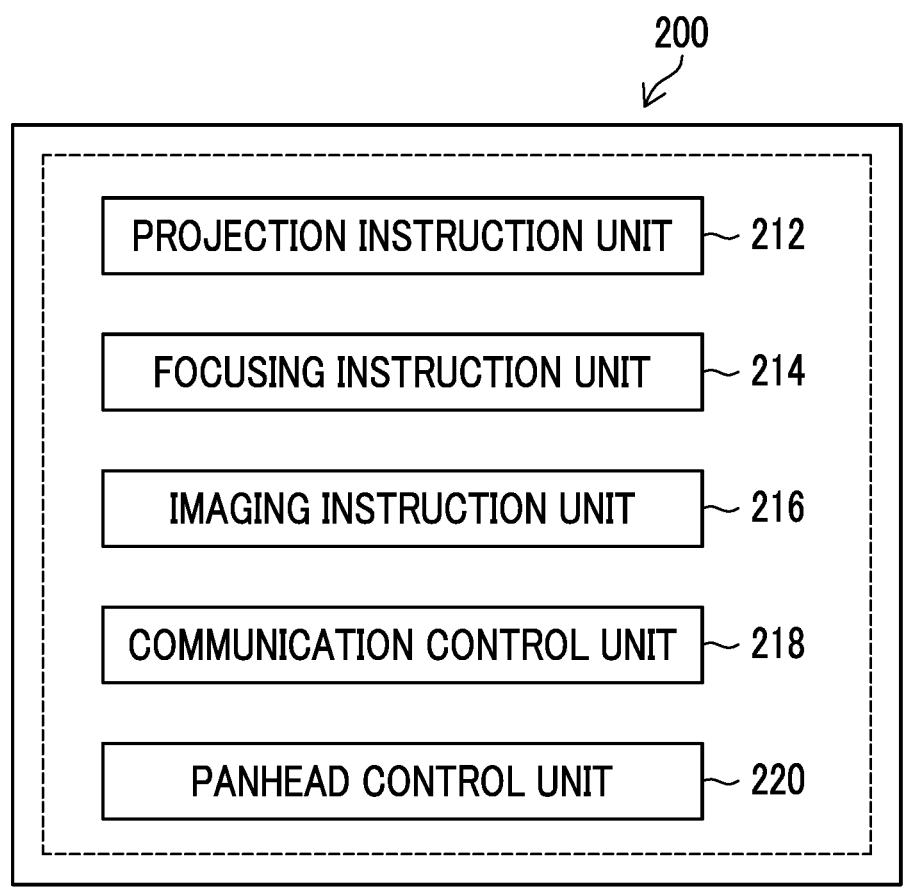
FIG. 2 is a diagram showing a functional configuration of a control device.

The control device 200 (imaging assistance apparatus, projection instruction device, focusing instruction device, imaging instruction device, and processor) gives instructions to the automatic panhead 300, the automatic panhead 310, the laser light projection device 400, and the imaging device 500 in response to the instruction (the preparation operation and an instruction corresponding to the first operation) from the remote release 100. FIG. 2 is a diagram showing a functional configuration of the control device 200. As shown in FIG. 2, the control device 200 has a projection instruction unit 212 (projection instruction output function), a focusing instruction unit 214 (focusing instruction output function), an imaging instruction unit 216 (imaging instruction output function), a communication control unit 218 (communication control function), and a panhead control unit 220 (panhead control function). The projection instruction unit 212 (projection instruction device and projection instruction output function) instructs laser modules 410 and 420 to start or end the projection of the patterned light, on the basis of an input related to the preparation operation and/or the first operation received by the remote release 100, the focusing instruction unit 214 (focusing instruction device) instructs the imaging device 500 to perform the focusing control on the basis of the preparation operation, and the imaging instruction unit 216 (imaging instruction device) instructs the imaging device 500 to image the subject on which the focusing control is performed, on the basis of the input related to the first operation. The communication control unit 218 controls communication between the control device 200 and the remote release 100, the automatic panhead 300, the automatic panhead 310, the laser light projection device 400, and the imaging device 500. The panhead control unit 220 instructs the automatic panheads 300 and 310 to move rotationally.

The above-described functions of the control device 200 can be realized by using various processors and recording media. Examples of the various processors include a central processing unit (CPU) which is a general-purpose processor that executes software (program) to realize various functions, a graphics processing unit (GPU) which is a processor specialized in image processing, and a programmable logic device (PLD) which is a processor of which the circuit configuration is changeable after manufacture, such as a field programmable gate array (FPGA). Each function may be realized by one processor, or may be realized by a plurality of processors of the same type or different types (for example, a plurality of FPGAs, a combination of a CPU and an FPGA, or a combination of a CPU and a GPU). Alternatively, a plurality of functions may be realized by one processor. More specifically, the hardware structure of these various processors is electrical circuits (circuitry) in which circuit elements, such as semiconductor elements, are combined.

In a case where the above-described processor or electrical circuits execute software (program), a computer (for example, various processors and electrical circuits constituting the control device 200 and/or a combination thereof) readable code of the software to be executed is stored in a non-temporary recording medium (memory) such as a ROM, and the computer refers to the software. At the time of execution, information stored in a storage device is used as necessary. Further, at the time of execution, for example, a random access memory (RAM; memory) is used as a temporary storage area.

The control device 200 can be realized by, for example, installing the imaging assistance program according to the embodiment of the present invention in a device (computer), such as a personal computer, a smartphone, or a tablet terminal.

[Configuration of Laser Light Projection Device]

Figure 3A:
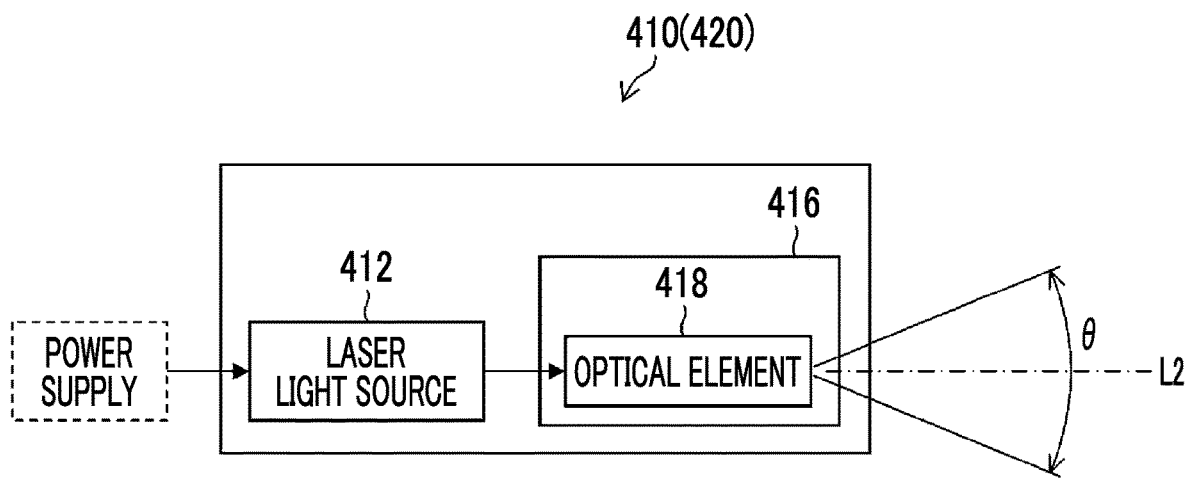
FIGS. 3A and 3B are diagrams showing a configuration of a laser module.
Figure 3B:
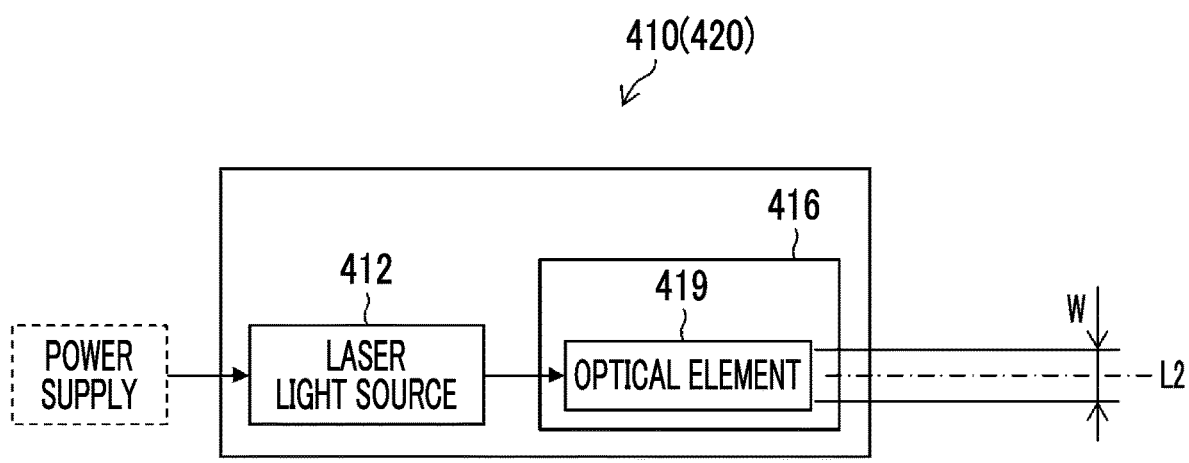

As shown in FIG. 1, the laser light projection device 400 comprises the laser modules 410 and 420. FIGS. 3A and 3B are diagrams showing configurations of the laser modules 410 and 420. In the example shown in FIG. 3A, in the laser module 410, a laser light source 412 (laser light source) that generates laser light and the laser head 416 (laser head) are housed in a single housing, but the laser light source 412 and the laser head 416 may be housed in housings independent of each other. In this case, a working portion (a portion mounted on the automatic panhead 300) can be further miniaturized. Further, the laser modules 410 and 420 may be provided with a collimator that generates a parallel beam from laser light.

The laser head 416 comprises an optical element 418 (optical element) that projects laser light as patterned light having a determined pattern. In the example shown in FIG. 3A, the optical element projects line-shaped patterned light (optical axis L2) having a spread beam angle θ, and in the example shown in FIG. 3B, the laser module 410 comprises an optical element 419, and the optical element 419 projects line-shaped patterned light (optical axis L2) having a beam width W. The pattern of the patterned light may be one line for one laser head or a cross-line in which a plurality of lines are crossed (see FIGS. 7A, 7B, and 8).

The output of the laser light can be 0.39 mW to 1.0 mW (class 2 of JIS C 6802). Further, it is preferable that the laser light has a wavelength range that at least partially overlaps with the transmission wavelength range of an optical filter disposed in the focusing control pixels disposed in an imaging element 522 of the imaging device 500. For example, in a case where the focusing control pixel is a G pixel (a pixel in which a green color filter is disposed), it is preferable that the laser light is green laser light (a wavelength range that at least partially overlaps with a wavelength range of 495 nm to 570 nm).

As for the laser module, for example, a product having a housing diameter of about 9 mm and a housing length of about 26 mm is on the market.

In the examples shown in FIGS. 3A and 3B, the same configuration can also be adopted for the laser module 420.

[Aspect of Optical Element]

As the above-described optical element 418, for example, any one of a laser line generator, a rod lens, a cylindrical lens, or a diffraction grating can be used.

Figure 4A:
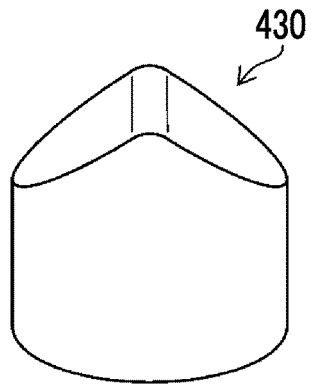
FIGS. 4A, 4B, and 4C are views showing an example of an optical element.
Figure 4B:
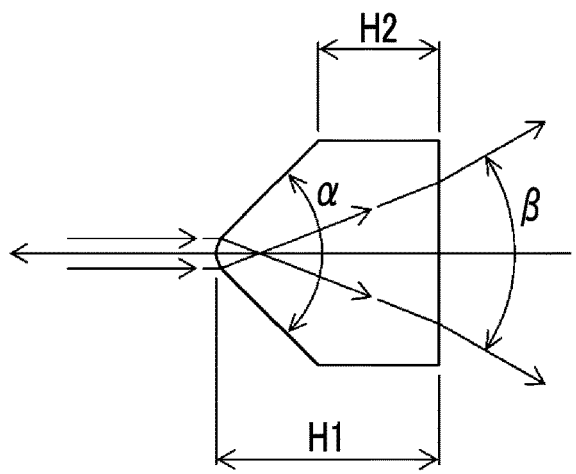
Figure 4C:
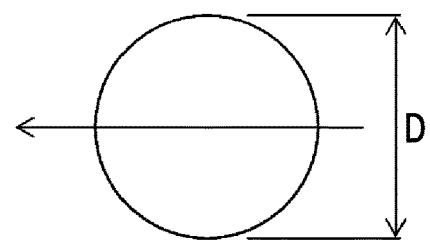

FIGS. 4A, 4B, and 4C are views showing an example (laser line generator) of the optical element. FIG. 4A is a perspective view, and a laser line generator 430 has a shape in which both sides of the cylinder are cut off diagonally. FIGS. 4B and 4C are a side view and a bottom view, respectively. As shown in FIGS. 4A, 4B, and 4C, the laser line generator 430 can generate a line-shaped beam (patterned light) having a spread in a uniaxial direction. A spread angle β of the beam is determined according to the vertical angle α and the like of the laser line generator 430. The dimensions of the laser line generator vary, but for example, products having a height H1 of about 9 to 10 mm, a height H2 of about 4 to 5 mm, and a diameter D of about 5 mm are on the market. The laser line generator is sometimes called a "laser line generator lens" or a "Powell lens".

Figure 5:
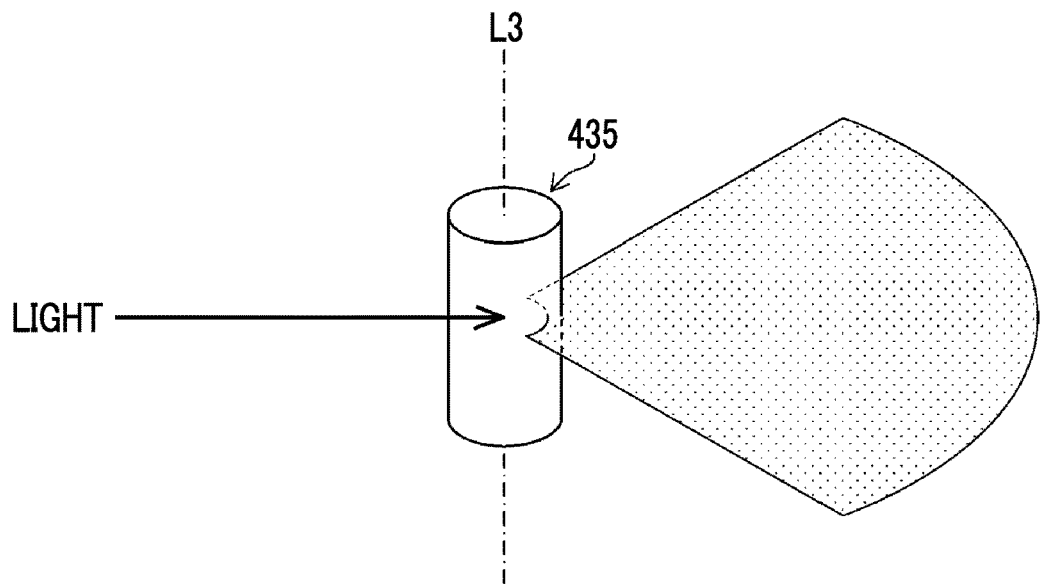
FIG. 5 is a view showing another example of the optical element.

FIG. 5 is a view showing another example (rod lens) of the optical element. In the example of FIG. 5, a rod lens 435 is cylindrical and has an optical axis L3. The rod lens 435 projects light incident from a direction perpendicular to the optical axis L3 as a line-shaped beam (patterned light) having a spread in a uniaxial direction (into a plane perpendicular to the optical axis L3).

Figure 6A:
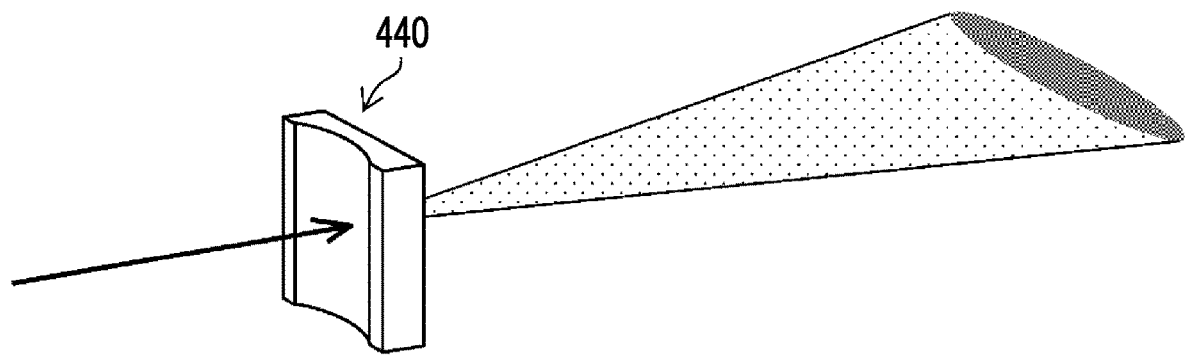
FIGS. 6A and 6B are views showing still another example of the optical element.
Figure 6B:
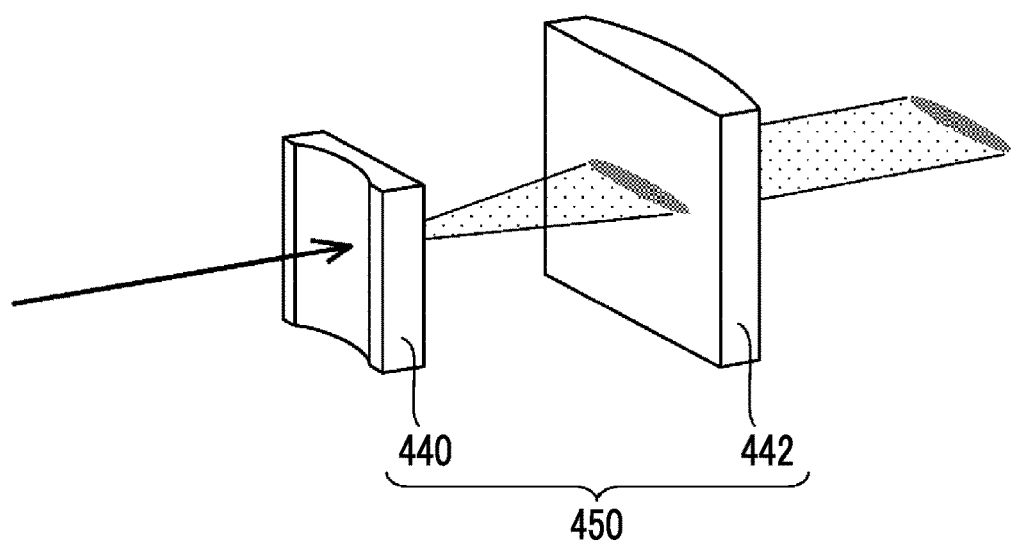

FIGS. 6A and 6B are views showing still another example (cylindrical lens) of the optical element. FIG. 6A is an example in which one cylindrical lens 440 projects a line-shaped beam (patterned light and sheet light) having a spread in a uniaxial direction, and FIG. 6B is an example in which a lens group 450 composed of the cylindrical lenses 440 and 442 projects a parallel line-shaped beam (patterned light and sheet light).

In addition to those shown in FIGS. 4A to 6B, a diffraction grating may be used as the optical element to project patterned light (for example, patterned light composed of a plurality of spots). It should be noted that one optical element or a plurality of optical elements may be used for the projection of the patterned light.

[Examples of Laser Module and Patterned Light]

Figure 7A:
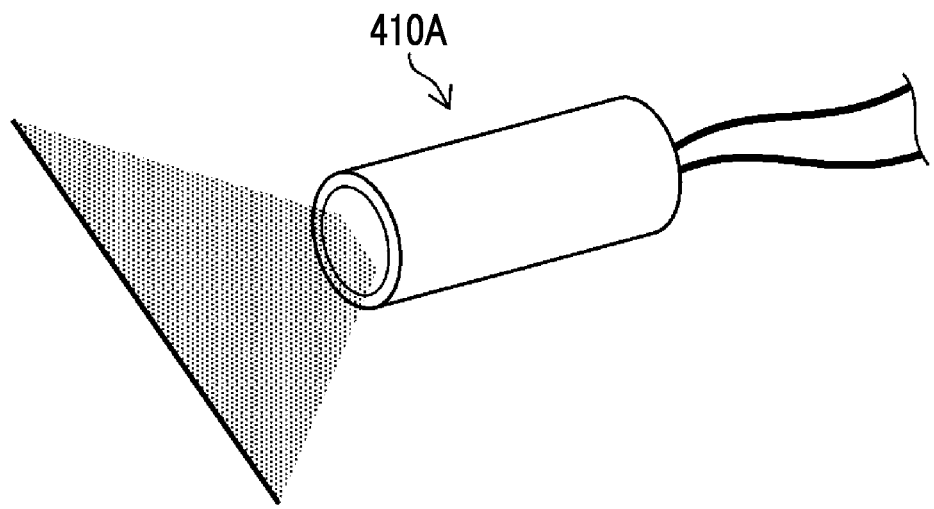
FIGS. 7A and 7B are views showing a situation in which the laser module projects patterned light.
Figure 7B:
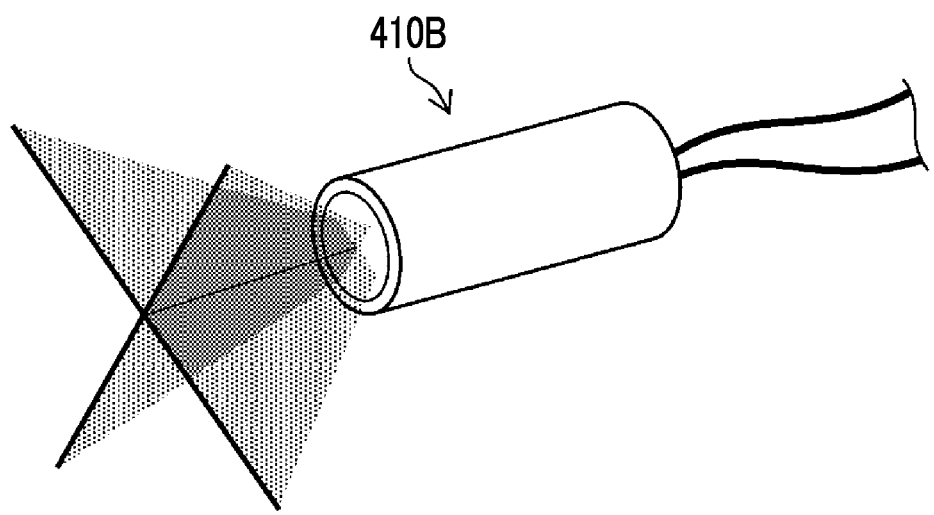

FIGS. 7A and 7B are views showing a situation in which the laser module projects patterned light. FIG. 7A is a view showing a situation in which a laser module 410A projects patterned light having one line-shaped pattern, and FIG. 7B is a view showing a situation in which a laser module 410B projects cross-line-shaped patterned light in which a plurality of lines are crossed. As shown in FIGS. 7A and 7B, a laser module that projects one line-shaped patterned light may be used, or a laser module that projects cross-lineshaped patterned light may be used. One or more laser modules may be used in order to obtain the desired pattern.

Figure 8:
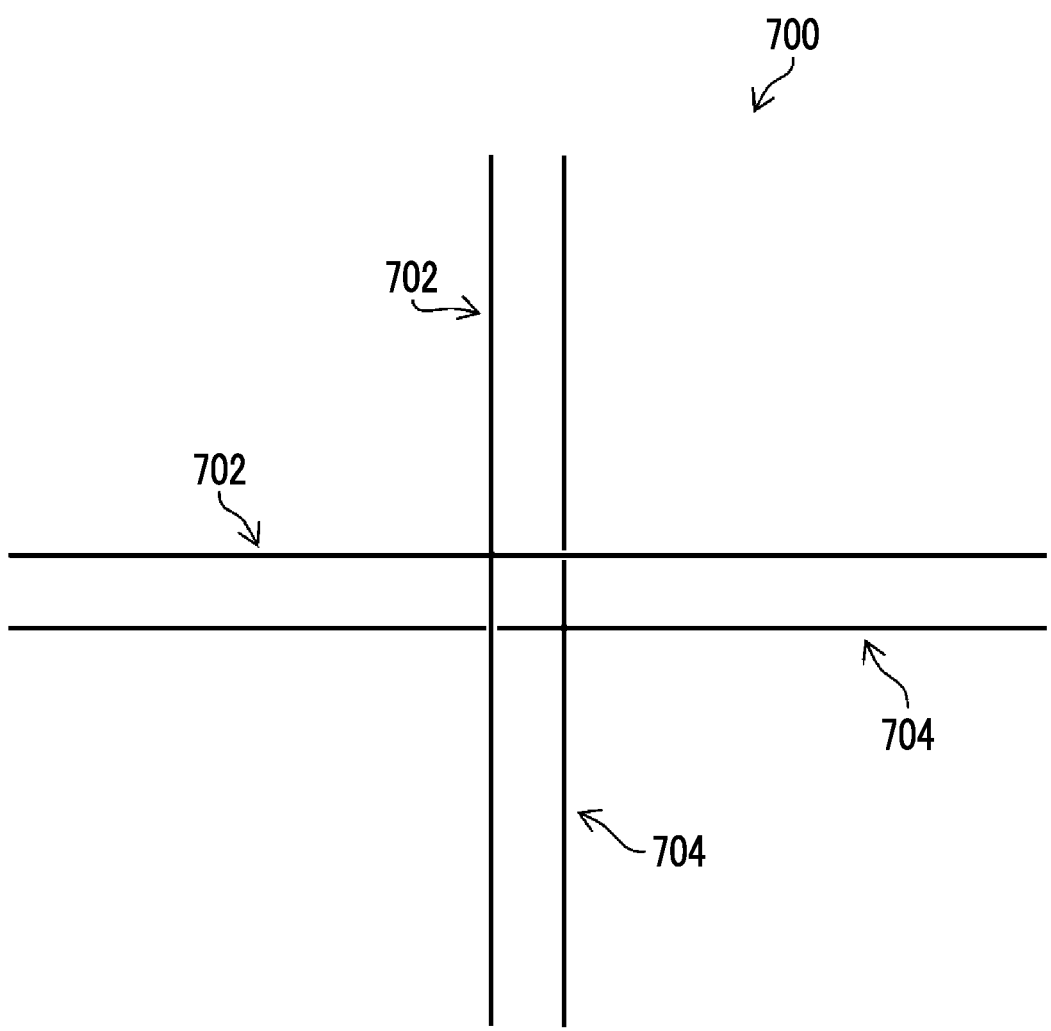
FIG. 8 is a diagram showing a cross-line-shaped patterned light.

FIG. 8 is a diagram showing cross-line-shaped patterned light. A pattern 700 shown in FIG. 8 is composed of cross-lines 702 and 704 in which two lines are crossed (orthogonal). Such a pattern 700 may be formed, for example, by using four laser modules 410A shown in FIG. 7A or by using two laser modules 410B shown in FIG. 7B.

It is preferable that the pattern of the patterned light projected by using the optical elements illustrated in FIGS. 4A to 6B and the like is a pattern corresponding to a disposition direction of the focusing control pixels disposed in the imaging element 522 (see FIG. 9) of the imaging device 500. For example, in a case where the focusing control pixels are disposed in the horizontal direction of the imaging element (or an imaging device main body), a pattern extending in the vertical direction (direction orthogonal to the disposition direction) is preferable. Since the pattern 700 illustrated in FIG. 8 is composed of a plurality of orthogonal lines, the pattern 700 has a component orthogonal to the disposition direction of the focusing control pixels regardless of the direction in which the focusing control pixels are disposed. Therefore, the imaging device 500 can recognize the pattern 700 to perform highly accurate focusing control.

The automatic panhead 300 is an electric automatic panhead that rotationally moves the laser light projection device 400 in a biaxial direction (pan and tilt) in response to instructions from the remote release 100 and the control device 200.

[Configuration of Imaging Device]

Figure 9:
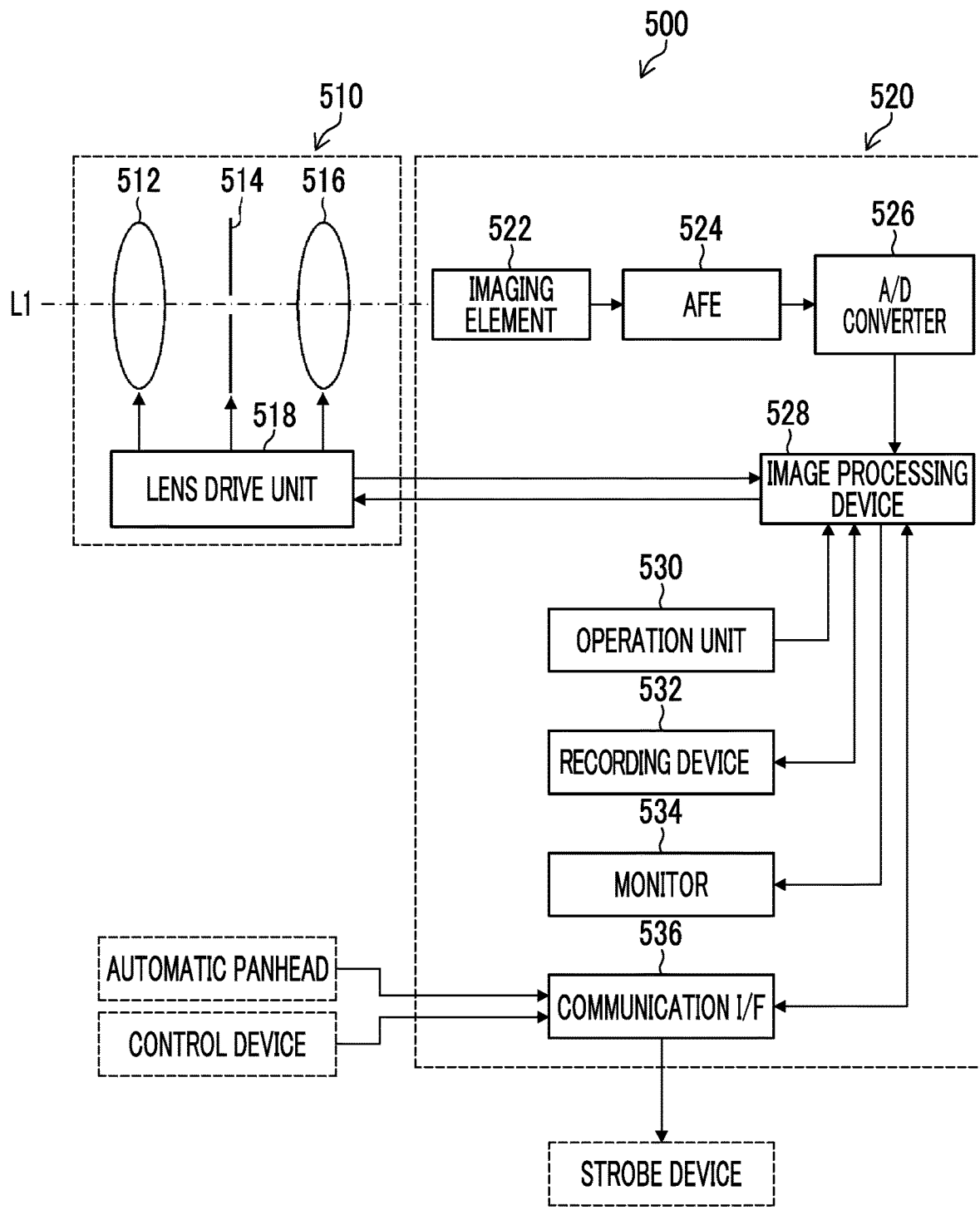
FIG. 9 is a diagram showing a configuration of an imaging device.

FIG. 9 is a diagram showing a configuration of the imaging device 500 (imaging device). The imaging device 500 is composed of an interchangeable lens 510 (optical system) and an imaging device main body 520 (imaging device main body), and a subject image (optical image) is formed on the imaging element 522 by an imaging lens including a zoom lens 512 and a focus lens 516, which will be described later. The interchangeable lens 510 and the imaging device main body 520 can be attached to and detached from each other via a mount (not shown). The lens device may be fixed to a camera body. The strobe device 505 is connected to the imaging device 500 via a communication I/F 536 (I/F: interface), and the strobe device 505 emits electronic flash light in response to an instruction from an image processing device 528 (an imaging control unit 540 and an electronic flash light control unit 544). A general digital camera can be used as the imaging device 500.

The automatic panhead 310 is an automatic panhead that rotationally moves the imaging device 500 in the biaxial direction (pan and tilt) in response to an instruction from the control device 200. An automatic panhead capable of instructing the imaging device 500 to perform focusing and/or imaging may be used.

[Configuration of Interchangeable Lens]

The interchangeable lens 510 comprises the zoom lens 512, a stop 514, the focus lens 516, and a lens drive unit 518. The lens drive unit 518 drives the zoom lens 512 and the focus lens 516 forward and backward in response to a command from the image processing device 528 (lens drive control unit 542 in FIG. 10; processor) to perform zoom adjustment and focus adjustment (focusing control). The focusing control can be performed by, for example, an image plane phase difference method, but a contrast method may also be used. Further, the lens drive unit 518 controls the stop 514 (stop mechanism) in response to a command from the image processing device 528 to adjust exposure. Meanwhile, information, such as positions of the zoom lens 512 and the focus lens 516 and an opening degree of the stop 514, is input to the image processing device 528. The interchangeable lens 510 has an optical axis L1.

[Configuration of Imaging Device Main Body]

The imaging device main body 520 comprises the imaging element 522 (imaging element), an AFE 524 (AFE: Analog Front End), an A/D converter 526 (A/D: Analog to Digital), and an image processing device 528 (processor). Further, the imaging device main body 520 comprises an operation unit 530, a recording device 532, a monitor 534 (display device), and the communication I/F 536. The imaging device main body 520 may have a shutter (not shown) that is used to shut off light transmitted through the imaging element 522. The shutter may be a mechanical shutter or an electronic shutter. In the case of the electronic shutter, the charge accumulation period of the imaging element 522 is controlled by the image processing device 528 so that the exposure time (shutter speed) can be adjusted.

The imaging element 522 comprises a light receiving surface in which a large number of light receiving elements are arranged in a matrix form. Then, the image of subject light transmitted through the zoom lens 512, the stop 514, and the focus lens 516 is formed on the light receiving surface of the imaging element 522, and is converted into an electrical signal by each light receiving element. A color filter of red (R), green (G), or blue (B) is provided on the light receiving surface of the imaging element 522, and a color image of the subject can be acquired on the basis of a signal of each color. Further, the focusing control pixels (for example, pixels used for focusing control of an image plane phase difference method) may be disposed in the imaging element 522 in a determined direction (for example, a horizontal direction and/or a vertical direction of the imaging device main body 520). The imaging device 500 (the imaging control unit 540 and the lens drive control unit 542) can perform the focusing control on the basis of a signal output from such a focusing control pixel. The focusing control pixel can be a green (G) pixel, but the present invention is not limited thereto.

As the imaging element 522, various photoelectric conversion elements such as a complementary metal-oxide semiconductor (CMOS) and a charge-coupled device (CCD) can be used. The AFE 524 performs noise removal, amplification, and the like of an analog image signal output from the imaging element 522, and the A/D converter 526 converts the captured analog image signal into a digital image signal with a gradation width. In the CMOS type imaging element, an AFE, an A/D converter, and a digital signal processing unit may be incorporated in a chip.

[Configuration of Image Processing Device]

Figure 10:
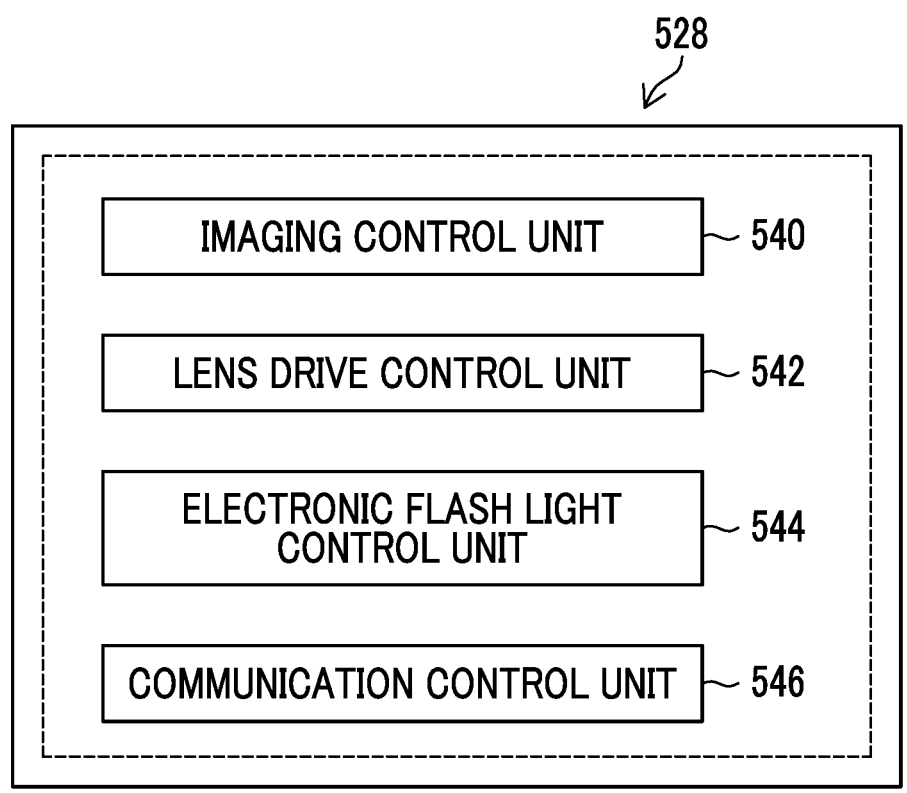
FIG. 10 is a diagram showing a functional configuration of an image processing device.

FIG. 10 is a diagram showing a functional configuration of the image processing device 528. The image processing device 528 has the imaging control unit 540, the lens drive control unit 542, the electronic flash light control unit 544, and a communication control unit 546. These functions can be realized by using various processors (electrical circuits) and recording media in the same manner as described above for the control device 200.

[Configuration of Operation Unit]

The operation unit 530 includes various switches, buttons, dials, and the like, and the user can perform operations necessary for imaging a subject by using these devices. A touch panel type device is used, whereby the monitor 534 may be used as the operation unit.

[Configuration of Storage Unit]

The recording device 532 is composed of a non-temporary recording medium, such as various semiconductor memories, and a control unit thereof, and can record captured images and the like.

[Monitor]

The monitor 534 (display device) is, for example, a device such as a liquid crystal display, and can display information necessary for acquiring an image, a captured image, or the like. As described above, a touch panel type device may be used as the monitor 534.

[Imaging of Subject]

Figure 11:
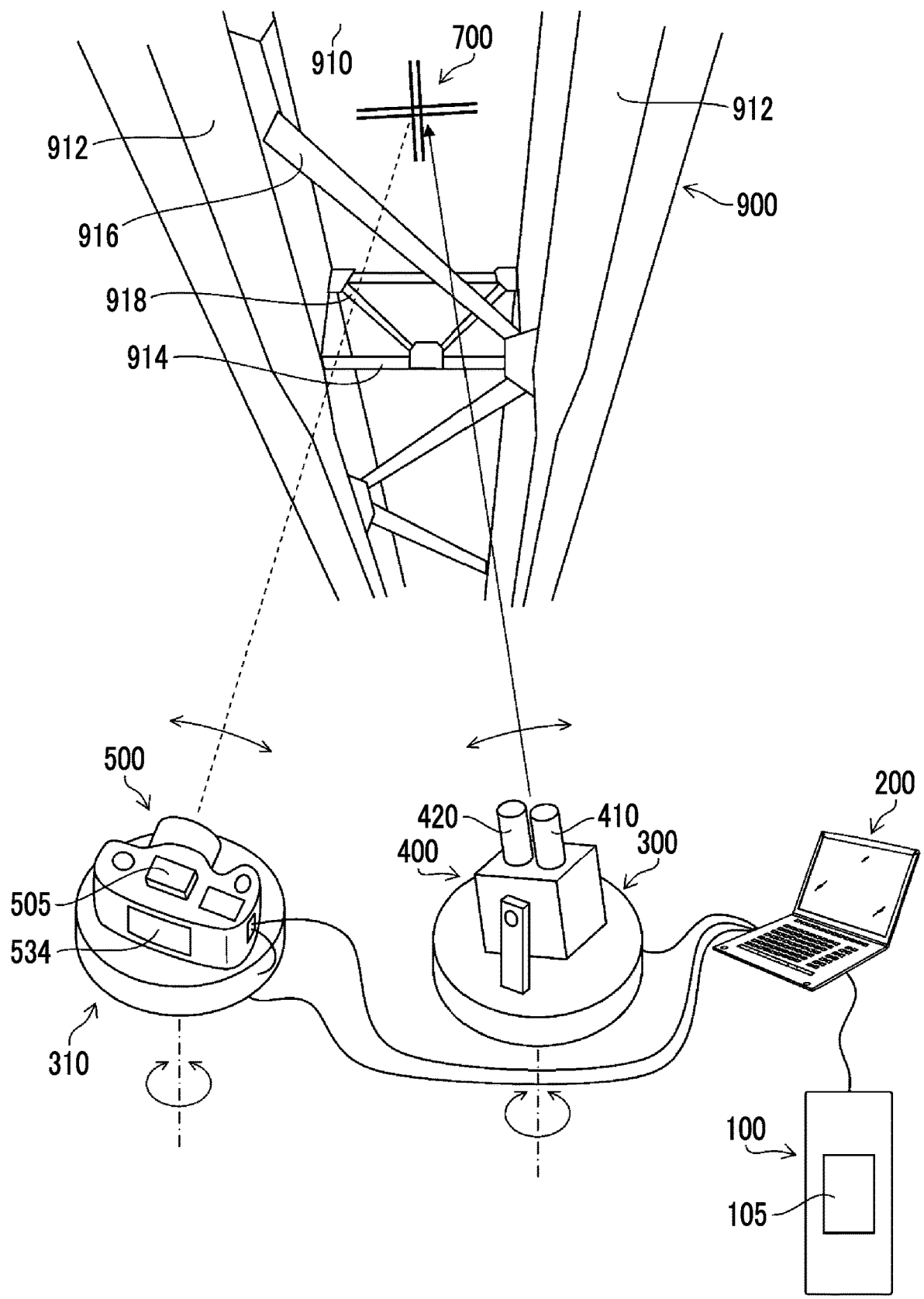
FIG. 11 is a view showing a situation of imaging performed by the imaging system according to the first embodiment.

FIG. 11 is a view illustrating a situation of imaging with the imaging system 10 according to the first embodiment. In the example shown in FIG. 11, the subject is a bridge 900, which is an aspect of a concrete structure (viewed from below; the same applies to the following embodiments), and the bridge 900 has members, such as a floor slab 910, a main girder 912, a cross-beam 914, a lateral brace 916, and a sway brace 918.

[Preparation Operation and Projection Instruction and Focusing Instruction]

In a case where the user performs an operation (preparation operation) to push the operation member 105 to the middle of the stroke, the remote release 100 receives the preparation operation (reception step) and instructs the laser light projection device 400 to start the projection of patterned light, according to the preparation operation (projection instruction step). In response to this instruction, the laser modules 410 and 420 start the projection of patterned light, and the pattern 700 is formed on the bridge 900 (floor slab 910) which is the subject (projection step). The user can confirm that the pattern 700 is captured in the visual field of the imaging device 500, through the monitor 534. Further, the remote release 100 instructs the imaging device 500 to perform focusing control on the subject on which the patterned light is projected, according to the preparation operation (focusing instruction step). The instruction from the remote release 100 is once transmitted to the control device 200 and is finally given from the control device 200 to the laser light projection device 400 and/or the imaging device 500 (the same applies to the following processing).

The imaging device 500 (the imaging control unit 540 and the lens drive control unit 542) recognizes the pattern 700 in response to the instruction to perform the focusing control, drives the focus lens 516 via the lens drive unit 518, and focuses on a part (a part of the floor slab 910 in this example) on which the pattern 700 is projected (focusing control step).

At the time of imaging, the user can perform an operation (the second operation and the third operation) to rotationally move the automatic panheads 300 and 310, with respect to the remote release 100, as necessary. The remote release 100 receives this operation (reception step) and gives an instruction to rotationally move the automatic panheads 300 and 310 (via the projection instruction unit 212, the imaging instruction unit 216, and the panhead control unit 220 of the control device 200) (a projection direction change step and an imaging direction change step), and the automatic panheads 300 and 310 change the projection direction of the patterned light (a pattern formation position and a focusing position) and/or the imaging direction in response to this instruction.

The start (end) of the projection of laser light may be performed by the laser light source 412 starting (ending) the generation of the laser light, or by providing a member that blocks laser light in the laser head 416 to stop (start) blocking the laser light by using this member.

[Detection of Plane Region Based on Patterned Light]

Figure 12A:
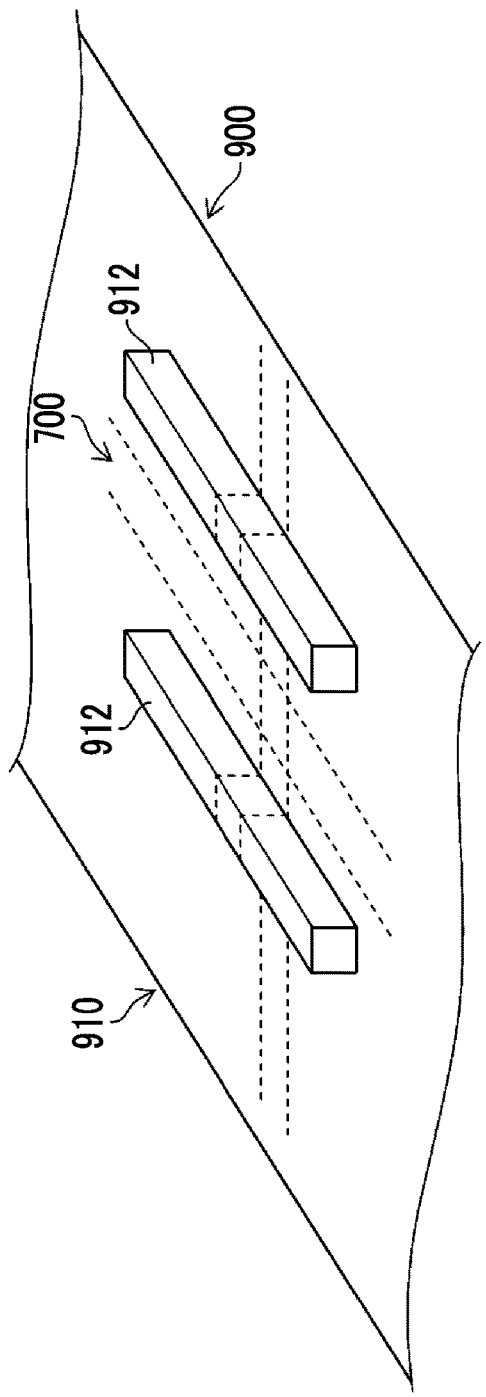
FIGS. 12A and 12B are views showing a situation of plane recognition using patterned light and focusing control based on the recognition result.
Figure 12B:
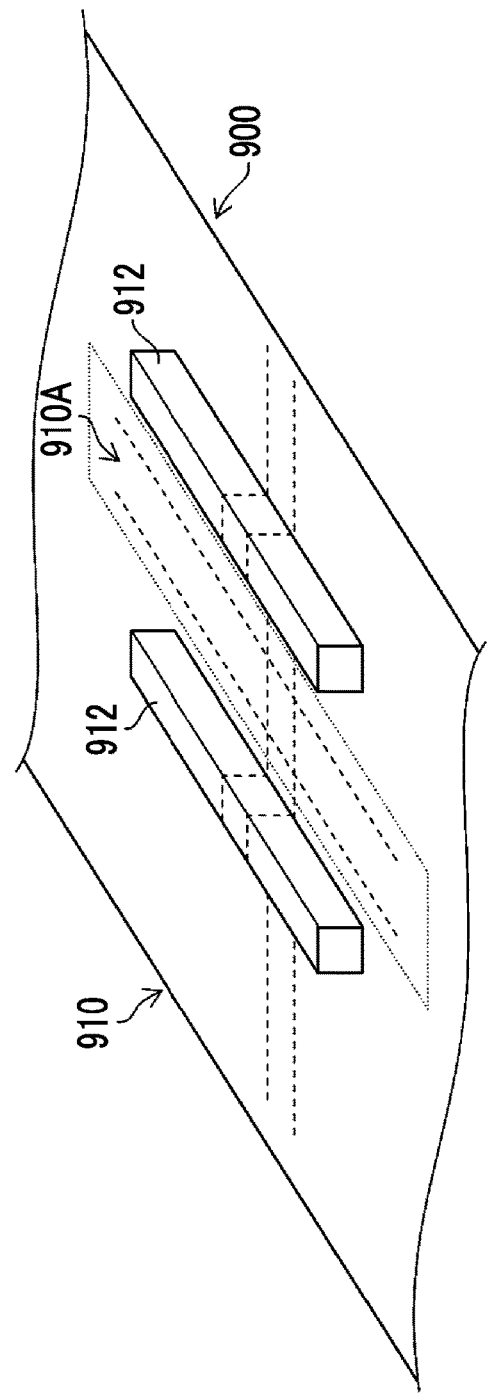

In the above-described focusing control, the imaging device 500 (the imaging control unit 540 and the lens drive control unit 542) may detect the plane region on the basis of the projected pattern, and may perform the focusing control on the detected plane region, as illustrated in FIGS. 12A and 12B (views showing the situation of plane recognition using patterned light and the focusing control based on the recognition result) (focusing control step). FIG. 12A shows a situation in which the pattern 700 is projected onto the floor slab 910 provided with the main girder 912, and the pattern 700 is uneven at the portion of the main girder 912. The imaging device 500 detects a plane region 910A (a region between the main girders 912), as shown in FIG. 12B, from the shape of such a pattern 700 and focuses on the plane region 910A. Such control is performed, so that it is possible to prevent the unnecessary structure (the main girder 912 in the example of FIGS. 12A and 12B) from being focused, and to acquire an image in which the plane (plane region 910A) of the subject is accurately focused.

[First Operation and Imaging Instruction]

In a case where the user performs an operation (first operation) to push the operation member 105 to the end of the stroke following the preparation operation (that is, in a case where the preparation operation is received before the first operation), the remote release 100 receives the first operation (reception step) and instructs the laser modules 410 and 420 to end the projection of the patterned light, according to the first operation (projection instruction step). In response to this instruction, the laser modules 410 and 420 end the projection of the patterned light. Further, the remote release 100 instructs the imaging device 500 to image the subject on which the focusing control is performed, according to the first operation (imaging instruction step). The imaging device 500 (imaging control unit 540) images the subject in response to this instruction (imaging step). In a case where the illuminance is low, the imaging device 500 causes the electronic flash light source of the strobe device 505 to emit light via the electronic flash light control unit 544 (light emission step).

[Sequence of Focusing Control and Imaging Control]

FIGS. 13A and 13B are diagrams showing an example of a sequence of the focusing control and the imaging control performed by the control device 200. In FIG. 13A, the upper part shows a signal (instruction) that is received from the remote release 100, and the lower part shows a signal (instruction) that is output to the imaging device 500. In the example of FIGS. 13A and 13B, the preparation operation is performed in the period from time T1 to time T2, and in response to this, an instruction to start the projection of patterned light and to perform the focusing control is given by a signal S1. Further, the first operation is performed in the period from time T2 to time T3, and in response to this, an instruction to end the projection of the patterned light and to perform imaging is given by the signal S2. The imaging device 500 maintains the focused state even in the period from time T2 to time T3.

Regarding FIG. 13A, in the above-described sequence, the patterned light is projected only during the focusing control (from time T1 to time T2), but the patterned light may be continuously output, and the focusing control may be continued during that period. Specifically, as shown in FIG. 13B, the patterned light is not projected during the period from time T2 to time T3 (imaging period), and the patterned light is projected in the other period (until time T2 and after time T3). In this mode, the patterned light is projected even in the period when the preparation operation is not performed, and the focusing control (AF search; AF means "Auto Focus") is executed. As a result, it is not necessary to perform the focusing control from a state in which the degree of focusing is low, so that the focusing control is speeded up and the stability thereof is improved. Such a control sequence is effective in a case where the imaging device 500 is mounted on a moving body with a motion (drone, vehicle, or the like) or the like. Such a control mode may be called "pre-AF mode".

[Control Based on Repetition Instruction]

The projection of the patterned light, the focusing control, and the imaging described above can be repeated at a predetermined cycle. In a case where these are repeatedly performed, the repetition instruction to repeat the preparation operation performed before the first operation and the first operation at a predetermined cycle is recorded in the memory, and the remote release 100 and/or the control device 200 repeats the instruction to start the projection of the patterned light based on the preparation operation, the instruction to end the projection of the patterned light based on the first operation, the instruction to perform the focusing control, and the instruction to perform the imaging, in accordance with this repetition instruction. The imaging device 500 repeats the focusing control and the imaging at the above-described cycle in response to instructions from the remote release 100 and/or the control device 200 to image the subject. This imaging may be for moving images or continuous still images. For example, in the case of the sequence shown in FIG. 13A, the cycle is $\Delta T$ (=T3-T1). The memory that records the repetition instruction can be provided in the remote release 100 and/or the control device 200.

[Control Based Only on First Operation]

Although FIGS. 13A, 13B, and the like illustrate a case where the projection of the patterned light and the focusing control are performed according to the preparation operation performed before the first operation and the first operation is performed following the preparation operation, the start and end of the projection of the patterned light, the focusing control, and the imaging control can be performed even in a case where the first operation is performed without the preparation operation. Specifically, as shown in FIG. 14A, in a case where the first operation is performed without the preparation operation (time T1), the remote release 100 and/or the control device 200 (the projection instruction device, the focusing instruction device, and the imaging instruction device) instructs the laser light projection device 400 to start the projection of the patterned light (time T1) and instructs the imaging device 500 to start the focusing control on the subject on which the patterned light is projected (time T1), on the basis of the first operation. Further, the remote release 100 and/or the control device 200 instructs the imaging device 500 to start the focusing control, and then instructs the laser light projection device 400 to end the projection of the patterned light (time T2) at a fixed interval (determined interval: T2-T1), and further instructs the imaging device 500 to image the subject on which the focusing control is performed (time T2). The remote release 100 and/or the control device 200 can set this "fixed interval" according to the characteristics of the imaging device 500 (focusing speed and the like), the characteristics of the subject, the imaging conditions, and the like.

Further, the patterned light may be continuously projected as in the sequence shown in FIG. 13B. Specifically, as shown in FIG. 14B, the remote release 100 and/or the control device 200 instructs the laser light projection device 400 to project the patterned light until time T2 and after time T3, and the projection of the patterned light can be stopped in the period from time T2 to time T3 (during the imaging period).

[Effect of First Embodiment]

As described above, with the imaging system 10 (the imaging assistance apparatus, the imaging system, the imaging assistance method, and the imaging assistance program) according to the first embodiment, the laser light projection device 400 and the imaging device 500 can be moved and rotationally moved independently of each other, and the control device 200 may not be necessarily moved or rotationally moved. Therefore, the working weight can be reduced, and the laser light projection device 400 and the imaging device 500 can be easily mounted on a moving body (robot, vehicle, drone, or the like). Further, since the laser light projection device 400 and the imaging device 500 are independent of each other, the degree of freedom of the projection of patterned light is high, and the focusing control can be satisfactorily performed with the patterned light.

Second Embodiment

Figure 15:
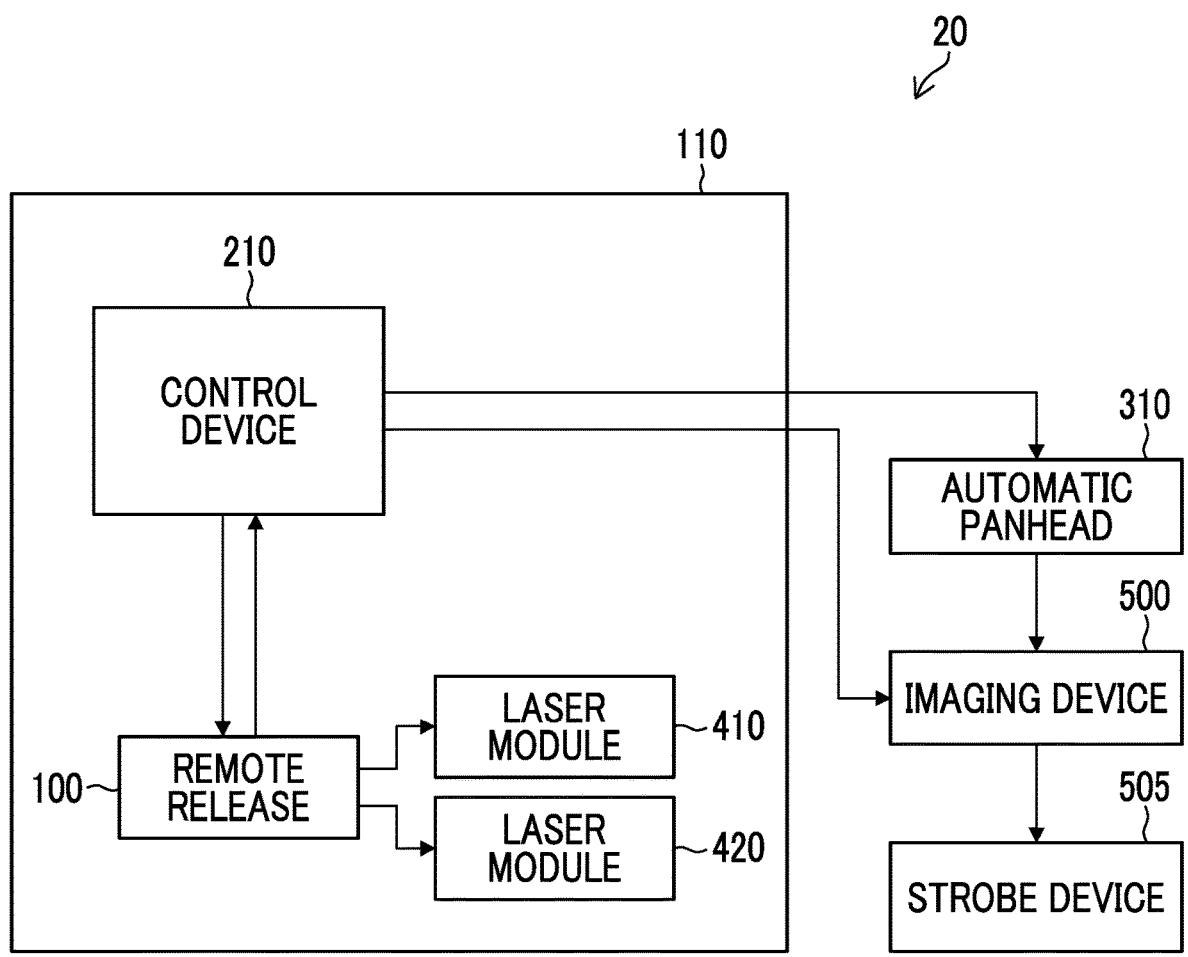
FIG. 15 is a diagram showing a schematic configuration of an imaging system according to a second embodiment.

A second embodiment of the present invention will be described. FIG. 15 is a diagram showing a schematic configuration of an imaging system 20 according to the second embodiment. In the above-described first embodiment, the remote release 100 and the control device 200 are housed in housings independent of each other, but in the second embodiment, the remote release 100, a control device 210, and the laser modules 410 and 420 are housed in a single housing as an imaging assistance apparatus 110 (imaging assistance apparatus). The configurations of the remote release 100 and the laser modules 410 and 420 are the same as those of the first embodiment, and the user can project patterned light onto the subject by operating the operation member 105.

Figure 16:
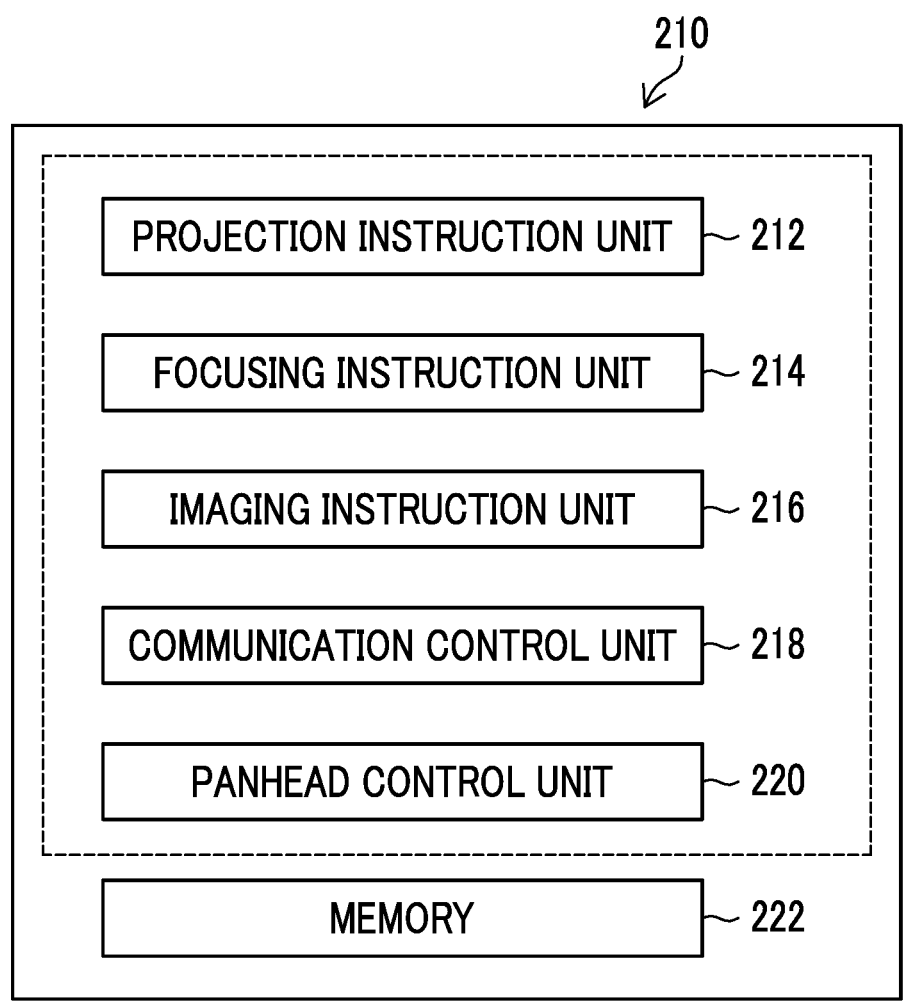
FIG. 16 is a diagram showing a functional configuration of a control device according to the second embodiment.

FIG. 16 is a diagram showing a functional configuration of the control device 210. The control device 210 comprises a memory 222 (memory) in which the above-described repetition instruction is recorded. The function of the control device 210 can also be realized by using various processors (electrical circuits) as in the control device 200 according to the first embodiment.

Figure 17:
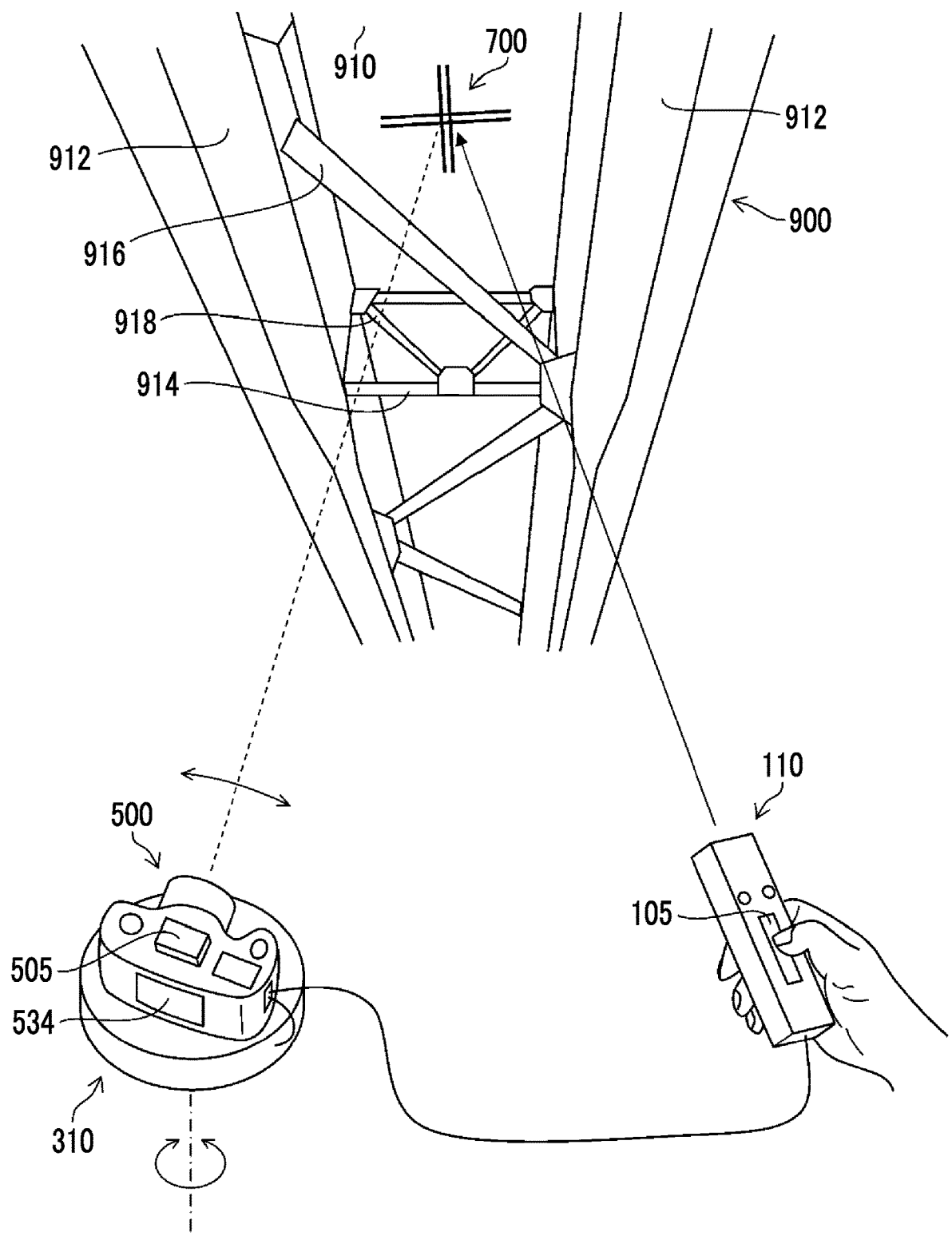
FIG. 17 is a view showing a situation of imaging performed by the imaging system according to the second embodiment.

FIG. 17 is a view showing a situation of imaging performed by the imaging system 20. As shown in FIG. 17, in a case where the user performs an operation (preparation operation) to push the operation member 105 of the imaging assistance apparatus 110 to, for example, the middle of the stroke, the remote release 100 (reception device) receives the preparation operation (reception step), and in response to this, the control device 210 instructs the laser modules 410 and 420 to start the projection of the patterned light (projection instruction step), and the pattern 700 is formed on the floor slab 910 (subject). The user can change the direction of the imaging assistance apparatus 110 to form the pattern 700 at the desired position.

It is preferable that the imaging direction of the imaging device 500 can be changed as necessary. Therefore, it is preferable that the remote release 100 is a device that receives an operation to rotationally move the automatic panhead 310 (the above-described third operation), and it is preferable that the control device 210 (the imaging instruction unit 216 and the panhead control unit 220) gives an instruction to rotationally move the automatic panhead 310, according to the third operation.

Figure 18:
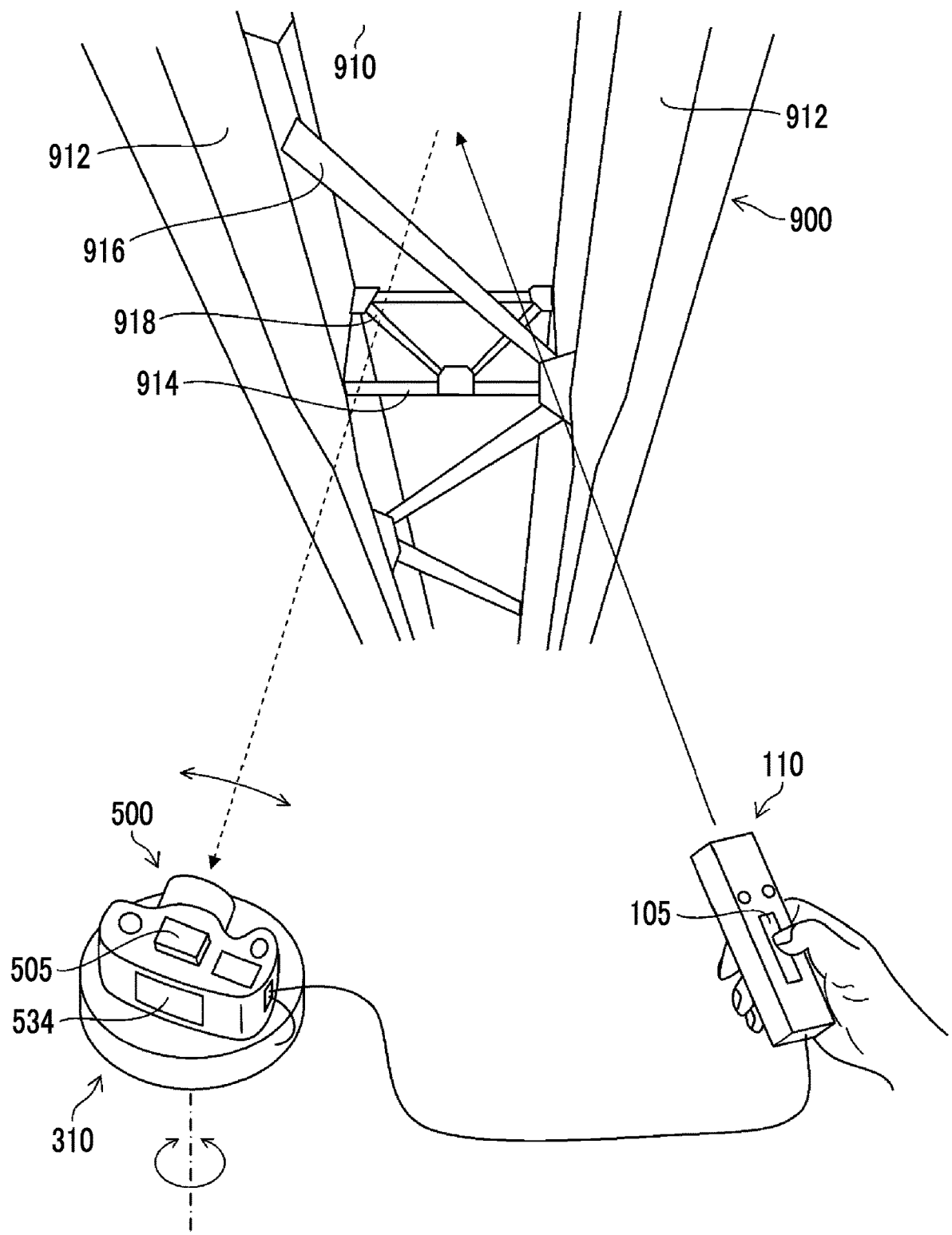
FIG. 18 is another view showing the situation of the imaging performed by the imaging system according to the second embodiment.

Further, the control device 210 instructs the imaging device 500 to perform the focusing control on the floor slab 910 on which the pattern 700 is projected (focusing instruction step), according to the preparation operation. With this, the focusing control is performed (focusing control step). In a case where the user performs an operation (first operation) to push the operation member 105 to, for example, the end of the stroke in a state in which the focusing control is performed, the control device 210 instructs the laser modules 410 and 420 to end the projection of the patterned light (projection instruction step), and the pattern 700 disappears as shown in FIG. 18. The control device 210 also instructs the imaging device 500 to image the subject, according to the first operation (imaging instruction step). At this time, the imaging device 500 causes the electronic flash light source of the strobe device 505 to emit light as necessary (light emission step). The sequence of these controls can be performed in the same manner as in the examples of FIGS. 13A and 13B. Further, such a sequence is performed in accordance with the repetition instruction recorded in the memory 222, so that the subject can be continuously imaged (moving images or continuous still images).

In a case where the first operation is performed without the preparation operation in the same manner as described above for the first embodiment, the start and end of the projection of the patterned light, the focusing control, and the imaging can be performed according to the first operation.

[Effect of Second Embodiment]

As described above, with the imaging system 20 according to the second embodiment, the laser modules 410 and 420 and the imaging device 500 are independent of each other, so that the projection position (focus position) of the pattern can be freely determined. Further, with this, the degree of freedom of the projection of the patterned light is high, and the focusing control can be satisfactorily performed with the patterned light.

Third Embodiment

Figure 19:
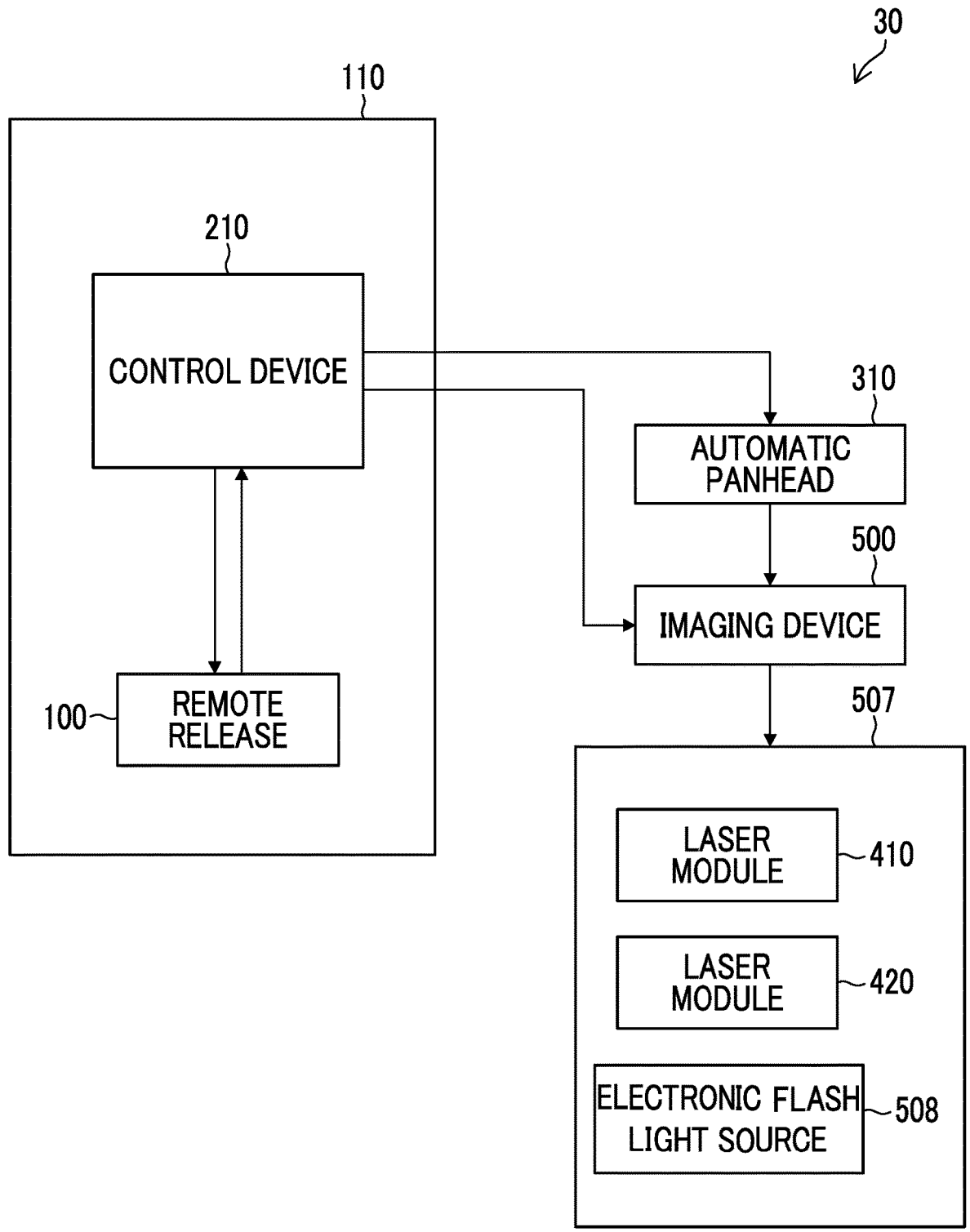
FIG. 19 is a diagram showing a schematic configuration of an imaging system according to a third embodiment.
Figure 20:
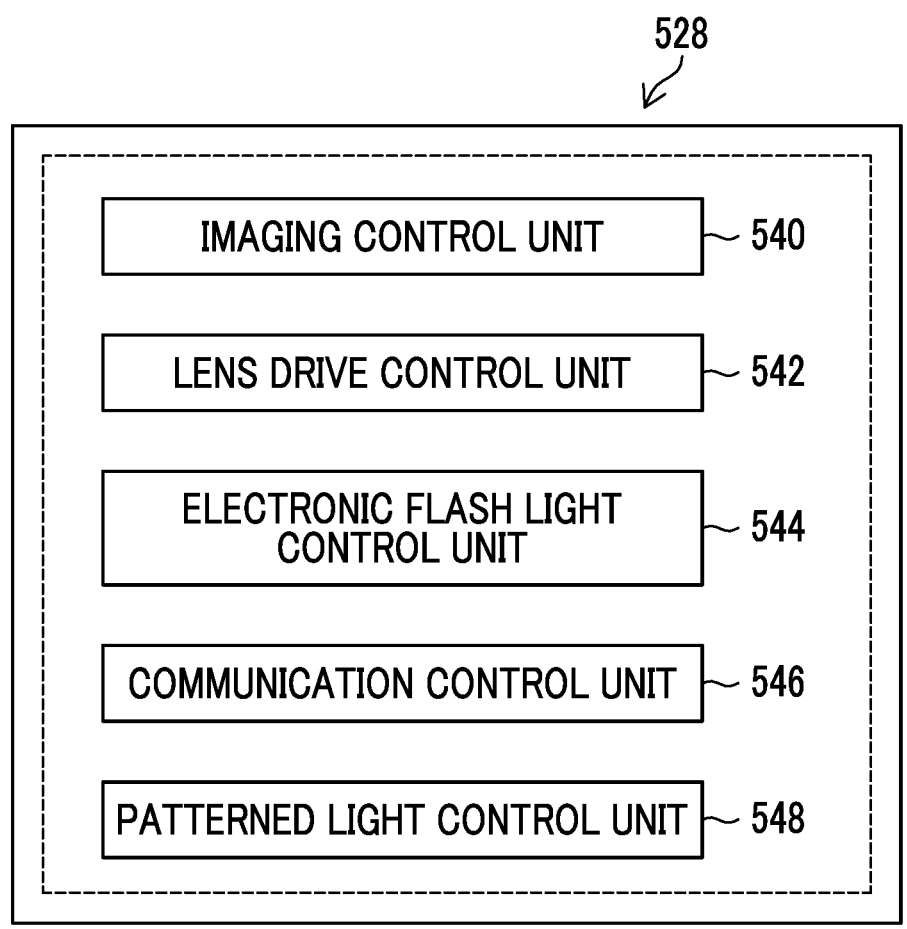
FIG. 20 is a diagram showing a functional configuration of a control device according to the third embodiment.

A third embodiment of the present invention will be described. FIG. 19 is a diagram showing a schematic configuration of an imaging system 30 according to the third embodiment. In the imaging system 30, the remote release 100 and the control device 210 are housed in a single housing as the imaging assistance apparatus 110 (imaging assistance apparatus, projection instruction device, focusing instruction device, and imaging instruction device), and the laser modules 410 and 420 (laser light projection device and imaging assistance apparatus) are housed in a strobe device 507. The strobe device 507 comprises an electronic flash light source 508. FIG. 20 is a diagram showing a functional configuration of the image processing device 528 provided in the imaging device 500, and the third embodiment is different from the first and second embodiments in that a patterned light control unit 548 (imaging assistance apparatus and projection instruction device) is provided.

Figure 21A:
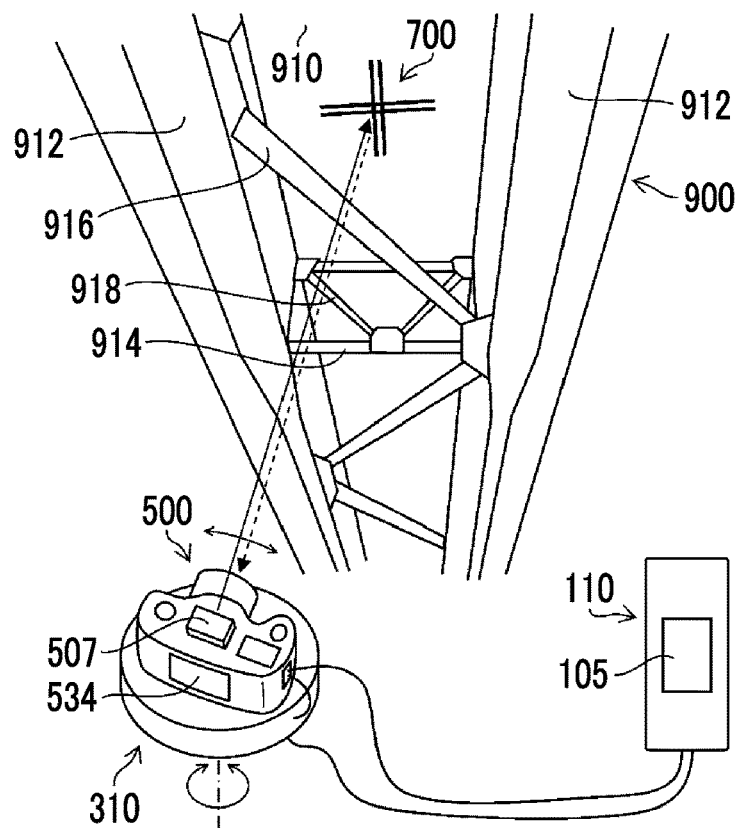
FIGS. 21A and 21B are views showing a situation of imaging performed by the imaging system according to the third embodiment.
Figure 21B:
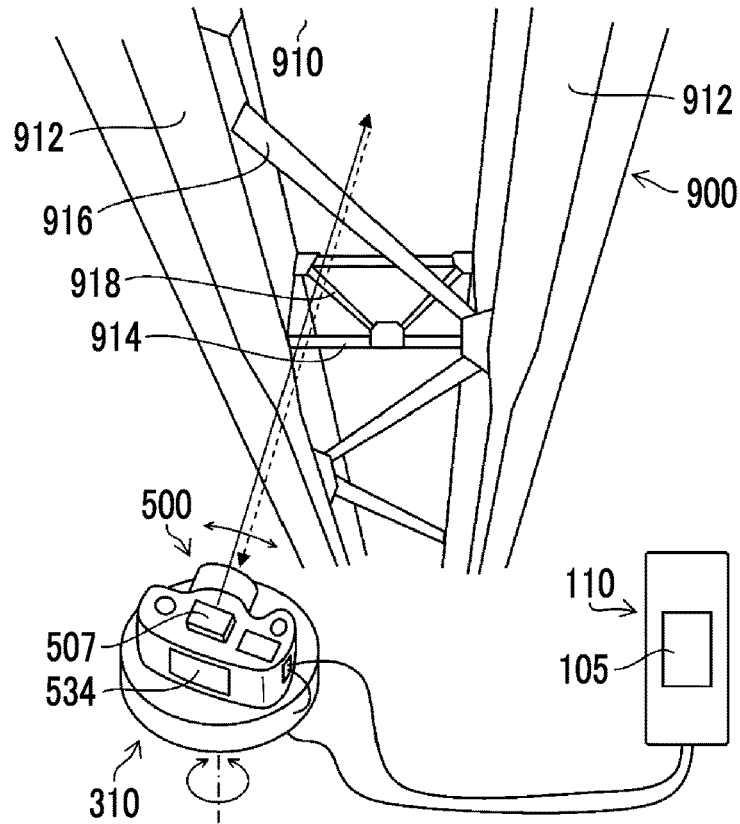

FIGS. 21A and 21B are views showing a situation of imaging performed by the imaging system 30 according to the third embodiment. In the case of the imaging system 30, the user can perform the start and end of the projection of the patterned light, the focusing control, and the imaging by operating the operation member 105 (the preparation operation and the first operation), as in the first and second embodiments. For example, as shown in FIG. 21A, the focusing control in a state in which the pattern 700 is projected and the imaging in a state in which the pattern 700 disappears as shown in FIG. 21B can be performed.

It is preferable that the remote release 100 is a device that receives an operation to rotationally move the automatic panhead 310 (the above-described third operation), and it is preferable that the control device 210 (the projection instruction unit 212, the imaging instruction unit 216, and the panhead control unit 220) gives an instruction to rotationally move the automatic panhead 310 in response to the instructions from the remote release 100 corresponding to the second operation and the third operation.

Even in such an imaging system 30, the focusing control can be satisfactorily performed with patterned light, as in the first and second embodiments.

The embodiments of the present invention have been described above, but the present invention is not limited to the above-described aspects, and various modifications can be made without departing from the spirit of the present invention.

EXPLANATION OF REFERENCES 10, 20, 30: imaging system
100: remote release
105: operation member
110: imaging assistance apparatus
200, 210: control device
212: projection instruction unit
214: focusing instruction unit
216: imaging instruction unit
218: communication control unit
220: panhead control unit
222: memory
300, 310: automatic panhead
400: laser light projection device
410, 410A, 410B, 420: laser module
412: laser light source
416: laser head
418, 419: optical element
430: laser line generator
435: rod lens
440, 442: cylindrical lens
450: lens group
500: imaging device
505, 507: strobe device
508: electronic flash light source
510: interchangeable lens
512: zoom lens
514: stop
516: focus lens
518: lens drive unit
520: imaging device main body
522: imaging element
524: AFE
526: A/D converter
528: image processing device
530: operation unit
532: recording device
534: monitor
536: communication I/F
540: imaging control unit
542: lens drive control unit
544: electronic flash light control unit
546: communication control unit
548: patterned light control unit
700: pattern
702, 704: cross-line
900: bridge
910: floor slab 910A: plane region
912: main girder
914: cross-beam
916: lateral brace
918: sway brace
α: vertical angle
β: spread angle
D: diameter
H1, H2: height
L1, L2, L3: optical axis
S1, S2: signal
θ: beam angle
T1, T2, T3: time
W: beam width

What is claimed is:

1. An imaging system comprising:
    an imaging assistance apparatus comprising:
        a laser light projection device having a laser light source that generates laser light and a laser head provided with an optical element that projects the laser light as patterned light having a determined pattern;
        a reception device that receives a first operation;
        a projection instruction device that instructs the laser light projection device during laser light projection to end the projection of the patterned light, on the basis of the first operation; and
        an imaging instruction device that instructs an imaging device to image a subject on which focusing control is performed, on the basis of the first operation; and
    the imaging device,
    wherein the imaging device performs the focusing control and the imaging in response to an instruction from the imaging assistance apparatus,
    the imaging system further comprises a memory in which a repetition instruction for causing the imaging assistance apparatus to repeat a preparation operation performed before the first operation and the first operation at a predetermined cycle is recorded,
    the imaging assistance apparatus repeats an instruction to start the projection of the patterned light based on the preparation operation and to end the projection of the patterned light based on the first operation, an instruction to perform the focusing control, and an instruction to perform the imaging, in accordance with the repetition instruction, and
    the imaging device repeats the focusing control and the imaging at the cycle in response to the instruction from the imaging assistance apparatus to image the subject.

2. The imaging system according to claim 1,
    wherein the reception device receives a preparation operation before the first operation, the projection instruction device instructs the laser light projection device to start the projection of the patterned light, on the basis of the preparation operation, and
    the imaging assistance apparatus further comprises a focusing instruction device that instructs the imaging device to start the focusing control on the subject on which the patterned light is projected, on the basis of the preparation operation.

3. The imaging system according to claim 1,
    wherein the projection instruction device instructs the laser light projection device to start the projection of the patterned light, on the basis of the first operation, and
    the imaging assistance apparatus further comprises a focusing instruction device that instructs the imaging device to start the focusing control on the subject on which the patterned light is projected, on the basis of the first operation.

4. The imaging system according to claim 3,
    wherein the projection instruction device instructs the laser light projection device to end the projection of the patterned light at a fixed interval after the start of the projection of the patterned light, on the basis of the first operation, and
    the imaging instruction device instructs the imaging device to image the subject on which the focusing control is performed, after the focusing instruction device instructs the imaging device to start the focusing control, on the basis of the first operation.

5. The imaging system according to claim 1,
    wherein the reception device receives a second operation, and
    the projection instruction device instructs the laser light projection device to change a projection direction of the patterned light, according to the second operation.

6. The imaging system according to claim 1,
    wherein the reception device receives a third operation, and
    the imaging instruction device instructs the imaging device to change an imaging direction, according to the third operation.

7. The imaging system according to claim 1,
    wherein the laser head is housed in a housing independent of the projection instruction device and the imaging instruction device.

8. The imaging system according to claim 2,
    wherein the laser head is housed in a housing independent of the projection instruction device, the focusing instruction device, and the imaging instruction device.

9. The imaging system according to claim 2,
    wherein the laser head and the reception device are housed in a single housing.

10. The imaging system according to claim 9,
    wherein the projection instruction device and the imaging instruction device are housed in the single housing.

11. The imaging system according to claim 9,
    wherein the projection instruction device, the focusing instruction device, and the imaging instruction device are housed in the single housing.

12. The imaging system according to claim 1,
    wherein the laser light source and the laser head are housed in a single housing.

13. The imaging system according to claim 1,
    wherein the laser light source and the laser head are housed in housings independent of each other.

14. The imaging system according to claim 1,
    wherein the laser head projects the patterned light with one line or a cross-line in which a plurality of lines are crossed, as the pattern.

15. The imaging system according to claim 1,
    wherein the optical element is any one of a laser line generator, a rod lens, a cylindrical lens, or a diffraction grating.

16. The imaging system according to claim 1, wherein an output of the laser light is 0.39 mW to 1.0 mW.

17. The imaging system according to claim 1,
    wherein the imaging device recognizes the pattern in response to an instruction to perform the focusing control, and focuses on a part on which the recognized pattern is projected.

18. The imaging system according to claim 1,
wherein the imaging device detects a plane region of the subject on the basis of the projected pattern and performs the focusing control on the plane region.

19. The imaging system according to claim 18,
wherein the imaging device performs the focusing control on a region where the projected pattern is not uneven.

20. An imaging system comprising:
an imaging assistance apparatus comprising:
- a laser light projection device having a laser light source that generates laser light and a laser head provided with an optical element that projects the laser light as patterned light having a determined pattern;
- a reception device that receives a first operation;
- a projection instruction device that instructs the laser light projection device during laser light projection to end the projection of the patterned light, on the basis of the first operation; and
- an imaging instruction device that instructs an imaging device to image a subject on which focusing control is performed, on the basis of the first operation; and the imaging device,
wherein the imaging device performs the focusing control and the imaging in response to an instruction from the imaging assistance apparatus,
the imaging device performs the focusing control on the basis of a signal output from a focusing control pixel disposed in an imaging element, and
the imaging assistance apparatus projects the patterned light having a pattern corresponding to a disposition direction of the focusing control pixel.

21. An imaging system comprising:
an imaging assistance apparatus comprising:
- a laser light projection device having a laser light source that generates laser light and a laser head provided with an optical element that projects the laser light as patterned light having a determined pattern;
- a reception device that receives a first operation;
- a projection instruction device that instructs the laser light projection device during laser light projection to end the projection of the patterned light, on the basis of the first operation; and
- an imaging instruction device that instructs an imaging device to image a subject on which focusing control is performed, on the basis of the first operation; and the imaging device,
wherein the imaging device performs the focusing control and the imaging in response to an instruction from the imaging assistance apparatus,
the imaging device performs the focusing control on the basis of a signal output from a focusing control pixel disposed in an imaging element, and
the imaging assistance apparatus projects laser light having a wavelength range that at least partially overlaps with a transmission wavelength range of an optical filter disposed in the focusing control pixel, as the patterned light.

22. The imaging system according to claim 1,
wherein the laser light projection device is capable of moving and rotationally moving, and the imaging device is capable of moving and rotationally moving independently of the laser light projection device.

* * * * *